US011374690B2

(12) United States Patent
Sugaya et al.

(10) Patent No.: US 11,374,690 B2
(45) Date of Patent: *Jun. 28, 2022

(54) INFORMATION PROCESSING APPARATUS, COMMUNICATION SYSTEM, INFORMATION PROCESSING METHOD AND PROGRAM

(71) Applicant: Sony Group Corporation, Tokyo (JP)

(72) Inventors: Shigeru Sugaya, Kanagawa (JP); Eisuke Sakai, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/239,720

(22) Filed: Apr. 26, 2021

(65) Prior Publication Data

US 2021/0250128 A1  Aug. 12, 2021

Related U.S. Application Data

(63) Continuation of application No. 16/776,533, filed on Jan. 30, 2020, now Pat. No. 10,992,421, which is a (Continued)

(30) Foreign Application Priority Data

May 1, 2015 (JP) .............................. JP2015-093785

(51) Int. Cl.
*H04L 1/00* (2006.01)
*H04L 1/16* (2006.01)
(Continued)

(52) U.S. Cl.
CPC .............. *H04L 1/16* (2013.01); *H04L 1/0057* (2013.01); *H04L 1/1614* (2013.01);
(Continued)

(58) Field of Classification Search
None
See application file for complete search history.

(56) References Cited

U.S. PATENT DOCUMENTS

| 7,924,805 B2 * | 4/2011 | Nishibayashi ......... H04L 47/14 370/346 |
| 10,574,397 B2 | 2/2020 | Sugaya et al. |

(Continued)

FOREIGN PATENT DOCUMENTS

| JP | 2005-142965 A | 6/2005 |
| JP | 2005-252697 A | 9/2005 |

(Continued)

OTHER PUBLICATIONS

"IEEE Standard for Telecommunications and Information Exchange Between Systems—LAN/MAN Specific Requirements—Part 15: Wireless Medium Access Control (MAC) and Physical Layer (PHY) Specifications for Low Rate Wireless Personal Area Networks (WPAN)," in IEEE Std 802.15.4-2003 , vol. No., pp. 1-680, (Year: 2003).*

M. Sipos, F. H. P. Fitzek, D. E. Lucani and M. V. Pedersen, "Distributed cloud storage using network coding," 2014 IEEE 11th Consumer Communications and Networking Conference (CCNC), 2014, pp. 127-132, doi: 10.1109/CCNC.2014.7056318. (Year: 2014).*

(Continued)

*Primary Examiner* — Daniel F. McMahon
(74) *Attorney, Agent, or Firm* — Xsensus LLP

(57) ABSTRACT

An information processing apparatus including a control unit that performs control for adding, to request information for requesting a different apparatus for a confirmation response to a plurality of data transmitted to the different apparatus, notification information. The notification information is information regarding at least sequence numbers other than a start sequence number from among sequence numbers corresponding to the plurality of data. Further, the control unit transmits the request information, to which the notification information is added, to the different apparatus.

20 Claims, 16 Drawing Sheets

Related U.S. Application Data continuation of application No. 15/559,304, filed as application No. PCT/JP2016/059303 on Mar. 24, 2016, now Pat. No. 10,574,397.

(51) Int. Cl.

| | | |
|---|---|---|
| *H04W 4/06* | (2009.01) | |
| *H04W 28/04* | (2009.01) | |
| *H04W 4/024* | (2018.01) | |
| *H04L 47/34* | (2022.01) | |
| *H04L 65/40* | (2022.01) | |

(52) U.S. Cl.
CPC ............ *H04L 1/1685* (2013.01); *H04L 29/08* (2013.01); *H04L 47/34* (2013.01); *H04W 4/024* (2018.02); *H04W 4/06* (2013.01); *H04W 28/04* (2013.01); *H04L 1/0009* (2013.01); *H04L 2001/0093* (2013.01)

(56) References Cited

U.S. PATENT DOCUMENTS

| | | | |
|---|---|---|---|
| 2006/0067238 A1* | 3/2006 | Olsson | H04L 1/1685 |
| | | | 370/242 |
| 2012/0084616 A1 | 4/2012 | Wentink | |
| 2012/0117446 A1 | 5/2012 | Taghavi Nasrabadi et al. | |
| 2014/0086204 A1* | 3/2014 | Lim | H04W 72/0446 |
| | | | 370/330 |

FOREIGN PATENT DOCUMENTS

| | | |
|---|---|---|
| JP | 2008-536272 A | 10/2006 |
| JP | 2013-542674 A | 11/2013 |
| JP | 2014-502094 A | 1/2014 |

OTHER PUBLICATIONS

Sipos et al., "Adaptive Network Coded Clouds: High Speed Downloads and Cost-Effective Version Control". IEEE Transactions on Cloud Computing, vol. 7, No. 1, Jan.-Mar. 2019, pp. 19-33.
International Search Report dated Jun. 14, 2016, in PCT/JP2016/059303 filed Mar. 24, 2016.

\* cited by examiner

EXAMPLE OF CONFIGURATION OF BLOCK ACK REQUEST FRAME

EXAMPLE OF CONFIGURATION OF BLOCK ACK FRAME

EXAMPLE OF SETTING REQUEST FOR MULTICAST COMMUNICATION (EXAMPLE OF OPERATION OF TRANSMISSION DESTINATION)

EXAMPLE OF SETTING REQUEST FOR MULTICAST COMMUNICATION (EXAMPLE OF OPERATION OF TRANSMISSION SOURCE)

EXAMPLE OF MULTICAST COMMUNICATION (EXAMPLE OF OPERATION OF TRANSMISSION SOURCE)

EXAMPLE OF MULTICAST COMMUNICATION
(EXAMPLE OF OPERATION OF TRANSMISSION DESTINATION)

INFORMATION PROCESSING APPARATUS, COMMUNICATION SYSTEM, INFORMATION PROCESSING METHOD AND PROGRAM

CROSS-REFERENCE TO RELATED APPLICATIONS

The present application is a continuation of U.S. application Ser. No. 16/776,533, filed Jan. 30, 2020, which is a continuation of U.S. application Ser. No. 15/559,304, filed Sep. 18, 2017 (now U.S. Pat. No. 10,574,397), which is based on PCT filing PCT/JP2016/059303, filed Mar. 24, 2016, which claims priority to JP 2015-093785, filed May 1, 2015, the entire contents of each are incorporated herein by reference.

TECHNICAL FIELD

The present technology relates to an information processing apparatus. More particularly, the present technology relates to an information processing apparatus, a communication system and an information processing method wherein exchange of data is performed utilizing wireless communication as well as a program for causing a computer to execute the method.

BACKGROUND ART

Conventionally, a wireless communication technology is available wherein exchange of data is performed utilizing wireless communication. For example, a communication method has been proposed wherein exchange of data is performed between different information processing apparatuses utilizing a wireless LAN (Local Area Network).

Further, in a communication system of a wireless LAN that complies with IEEE (Institute of Electrical and Electronic Engineers) 802.11, a protocol of block ACK (block acknowledgement) according to which, after a plurality of data are sequentially transmitted successively, reception confirmations are sent back collectively is utilized.

In a block ACK request frame, a sequence number (start sequence number) of a start data frame that requests acknowledgement is described. Meanwhile, an apparatus of a transmission destination of data sends back sequence numbers of data frames received after data corresponding to the start sequence number in a bitmap form.

Meanwhile, in a transmission sequence of unicast communication in a communication system of a wireless LAN, sequence numbers applied to individual data frames by an apparatus of a transmission source have successive values set for individual apparatuses of transmission destinations. Therefore, an apparatus of each transmission destination can manage only sequence numbers therefor. Further, a contrivance is prescribed wherein the sequence number is incremented by one for each transmitted data frame and management frame.

Further, for example, a technology has been proposed wherein a MAC (Media Access Control) super frame in which a plurality of MAC data are aggregated with identification information, which indicates whether or not delivery confirmation is required, embedded in header information is sent (for example, refer to PTL 1).

CITATION LIST

Patent Literature

[PTL 1]
JP 2005-252897A

SUMMARY

Technical Problem

In the prior art described above, whether or not sending back of acknowledgement is required can be specified in a unit of MAC data in a MAC super frame.

Here, an apparatus of a transmission destination need not send back reception confirmation with regard to a management frame (for example, a beacon signal) that is broadcasted to a plurality of destinations. Therefore, it is unnecessary for the apparatus of the transmission source to transmit a block ACK request and confirm reception of the same through a block ACK from the apparatus of the transmission destination.

Meanwhile, a sequence number for unicast communication is prepared for each apparatus of a transmission destination and is managed individually. However, sequence numbers of frames that are multicast transmitted or broadcast transmitted are not prepared individually but can be used in common. Therefore, one sequence number space is sometimes mixed in frames for various applications.

Here, as a sequence number management method, a contrivance is prepared wherein a sequence number is incremented by one for each data frame and management frame transmitted from an apparatus of a transmission source and transmitted. Therefore, if transmission of a management frame (for example, a beacon signal) is performed while data are successively transmitted from an apparatus of a transmission source, then intermittence occurs with sequence numbers in data transmission.

Further, although information of a start sequence number is described in a block ACK request frame, information of a sequence number for which sending back is actually requested is not described in regard to succeeding sequence numbers.

For example, there is the possibility that sequence numbers may become intermittent due to multicast data destined for a different apparatus or to failure in reception of a management frame. If intermittence occurs with sequence numbers in this manner, then since only information of a start sequence number is described in a block ACK request frame, there is the possibility that an apparatus of the transmission destination may fail to decide that a data frame is undelivered.

Therefore, where a plurality of data are exchanged between a plurality of apparatuses, it is significant to appropriately perform exchange of individual data.

The present technology has been devised taking such a situation as described above into consideration, and it is an object of the present technology to perform exchange of data appropriately.

Solution to Problem

The present technology has been devised to eliminate the problem described above, and a first aspect of the present technology is an information processing apparatus including a control unit configured to perform control for adding, to request information for requesting a different apparatus for a confirmation response to a plurality of data transmitted to the different apparatus, notification information regarding at least sequence numbers other than a start sequence number from among sequence numbers corresponding to the plurality of data and transmitting the request information, to which the notification information is added, to the different apparatus, and an information processing method as well as a program for causing a computer to execute the method. This brings about action that notification information is added to and transmitted together with request information to the different apparatus.

Further, in this first aspect, the control unit may add and transmit the notification information regarding a sequence number corresponding to specific data from among the plurality of data to and together with the request information to the different apparatus. This brings about action that notification information regarding a sequence number corresponding to specific data from among the plurality of data is added to and transmitted together with the request information to the different apparatus.

Further, in this first aspect, the specific data may be data destined for the information processing apparatus. This brings about action that notification information regarding a sequence number corresponding to the data destined for the information processing apparatus is added to and transmitted together with the request information to the different apparatus.

Further, in this first aspect, the specific data may be data to be passed to an upper layer. This brings about action that notification information regarding a sequence number corresponding to the data to be passed to the upper layer is added to and transmitted together with the request information to the different apparatus.

Further, in this first aspect, the specific data may be data of multicast communication to be received. This brings about action that notification information regarding a sequence number corresponding to the data of multicast communication to be received is added to and transmitted together with the request information to the different apparatus.

Further, in this first aspect, the specific data may be data from which parity information is removed. This brings about action that notification information regarding a sequence number corresponding to data from which parity information is removed is added to and transmitted together with the request information to the different apparatus.

Further, in this first aspect, the request information may be a block acknowledgement request frame. This brings about action that notification information is added to and transmitted together with a block acknowledgement request frame to the different apparatus.

Further, in this first aspect, the control unit may add and transmit the notification information regarding successive sequence numbers or intermittent sequence numbers from among the sequence numbers corresponding to the plurality of data to and together with the request information to the different apparatus. This brings about action that notification information regarding successive sequence numbers or intermittent sequence numbers from among the sequence numbers corresponding to the plurality of data is added to and transmitted together with the request information to the different apparatus.

Meanwhile, a second aspect of the present technology is an information processing apparatus including a control unit configured to decide, when request information that requests a confirmation response to a plurality of data transmitted from a different apparatus and to which notification information regarding at least sequence numbers other than a start sequence number from among sequence numbers corresponding to the plurality of data is added is received from the different apparatus, based on the notification information whether or not undelivered data exists from among data to be received by the own apparatus from among the plurality of data and perform, when the undelivered data does not exist, control for passing the plurality of data to an upper layer, and an information processing method as well as a program for causing a computer to execute the method. This brings about action that, when request information to which notification information is added is received from a different apparatus, it is decided on the basis of the notification information whether or not undelivered data exists from among data to be received by the own apparatus from among the plurality of data, and when the undelivered data does not exist, the plurality of data are passed to the upper layer.

Further, in this second aspect, the control unit may transmit, when the undelivered data exists, the confirmation response to which information regarding a sequence number for specifying the undelivered data is added to the different apparatus and perform, when the undelivered data no more exists as a result of re-sending of the undelivered data from the different apparatus, control for passing the plurality of data to the upper layer. This brings about action that, when the undelivered data exists, the confirmation response to which information regarding a sequence number for specifying the undelivered data is added is transmitted to the different apparatus, and when the undelivered data no more exists as a result of re-sending of the undelivered data from the different apparatus, control for passing the plurality of data to the upper layer is performed.

Further, in this second aspect, the control unit may pass, when the plurality of data that have successive sequence numbers are received without an error, the plurality of data to the upper layer without receiving the request information. This brings about action that, when the plurality of data that have successive sequence numbers are received without an error, the plurality of data are passed to the upper layer without receiving the request information.

Further, in this second aspect, the control unit may consider, when the plurality of data include data of parity information, the undelivered data that is repaired based on the parity information as data received already. This brings about action that, when the plurality of data include data of parity information, the undelivered data that is repaired based on the parity information is considered as data received already.

Further, a third aspect of the present technology is a communication system including a first information processing apparatus configured to add, to request information for requesting a second information processing apparatus for a confirmation response to a plurality of data transmitted to the second information processing apparatus, notification information regarding at least sequence numbers other than a start sequence number from among sequence numbers corresponding to the plurality of data and transmit the request information, to which the notification information is added, to the second information processing apparatus, and the second information processing apparatus configured to decide, when the request information is received from the first information processing apparatus, based on the notification information included in the request information whether or not undelivered data exists from among data to be received by the own apparatus from among the plurality of data and pass, when the undelivered data does not exist, the plurality of data to an upper layer, and an information processing method as well as a program for causing a computer to execute the method. This brings about action that the first information processing apparatus adds and transmits notification information to and together with request information to the second information processing apparatus, and when the second information processing apparatus receives the request information from the first information processing apparatus, it decides on the basis of the notification information included in the request information whether or not undelivered data exists from among data to be received by the own apparatus from among the plurality of data, and then, when the undelivered data does not exist, the plurality of data are passed to the upper layer.

Advantageous Effect of Invention

According to the present technology, an excellent effect that exchange of data can be performed appropriately can be achieved. It is to be noted that the effect described here is not necessarily restricted, but may be any of the effects described in the present disclosure.

DESCRIPTION OF EMBODIMENT

In the following, a mode for carrying out the present technology (hereinafter referred to as embodiment) is described. The description is given in the following order.

1. Embodiment (example in which an apparatus of the transmission source adds and transmits map information for specifying a sequence number to and together with a block ACK request frame and an apparatus of the transmission destination grasps presence of data, whose re-sending is not required, from among undelivered data on the basis of the map information)

2. Application Example

1. EMBODIMENT

Example of Configuration of Communication System

Figure 1:
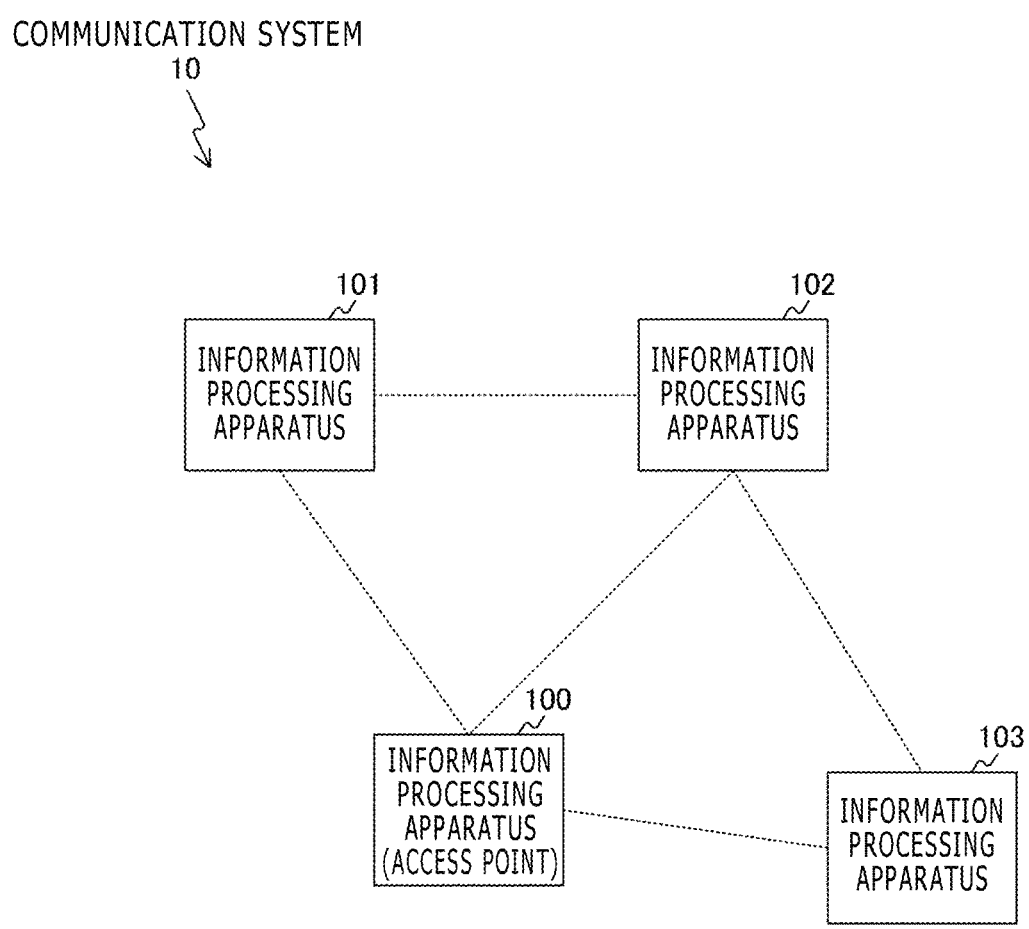
FIG. 1 is a view depicting an example of a configuration of a wireless network of a communication system 10 in an embodiment of the present technology.

FIG. 1 is a view depicting an example of a configuration of a wireless network of a communication system 10 in an embodiment of the present technology. In FIG. 1, an example of the communication system 10 is depicted in which the wireless network is configured from four information processing apparatuses 100 to 103.

For example, the information processing apparatuses 100 to 103 can be information processing apparatuses of the fixed type or the portable type having a wireless communication function. Here, an information processing apparatus of the fixed type is an information processing apparatus such as, for example, an access point, a base station or the like in a wireless LAN system. Meanwhile, an information processing apparatus of the portable type is an information processing apparatus such as, for example, a smartphone, a portable telephone set, a tablet terminal or the like.

Further, the information processing apparatuses 100 to 103 include a communication function that complies, for example, with the wireless LAN standard of IEEE 802.11. Further, as the wireless LAN, for example, Wi-Fi (Wireless Fidelity), Wi-Fi Direct, Wi-Fi CERTIFIED Miracast specifications (technical specification name: Wi-Fi Display) can be used. Alternatively, wireless communication in which a different communication method is used may be performed.

For example, the communication system 10 can be formed as a network in which a plurality of apparatuses are connected to each other by performing wireless communication by the plurality of apparatuses in a one by one relationship (for example, mesh network or ad hoc network). For example, the communication system 10 can be applied to a mesh network of IEEE802.11s.

Further, for example, the communication system 10 can be a network configured from an access point (parent station) and a subordinate apparatus (child station). For example, if the information processing apparatus 100 is an access point, then the information processing apparatuses 101 to 103 are made subordinate apparatuses to the access point (information processing apparatus 100). It is to be noted that the embodiment of the present technology indicates an example in which the information processing apparatus 100 is an access point.

Further, in FIG. 1, those apparatuses which can communicate directly with each other utilizing wireless communication are depicted such that they are connected to each other by a dotted line. In particular, it is assumed that the information processing apparatus 101 can communicate with the information processing apparatus 102 and the information processing apparatus 100. Further, it is assumed that the information processing apparatus 102 can communicate with the information processing apparatus 101, the information processing apparatus 103 and the information processing apparatus 100. Further, it is assumed that the information processing apparatus 103 can communicate with the information processing apparatus 102 and the information processing apparatus 100. Furthermore, the information processing apparatus 100 can communicate with the information processing apparatus 101, the information processing apparatus 102 and the information processing apparatus 103.

Further, the information processing apparatus 100 can transmit multicast data to a plurality of apparatuses. For example, the information processing apparatus 100 can transmit first multicast data to the information processing apparatus 101 and the information processing apparatus 102. Further, the information processing apparatus 100 can transmit second multicast data to the information processing apparatus 102 and the information processing apparatus 103. Further, the information processing apparatus 100 can transmit third multicast data to the information processing apparatus 101 and the information processing apparatus 103.

It is to be noted that, although, in the description of the embodiment of the present technology, operation of an apparatus of the transmission source (transmission side apparatus) and an apparatus of the transmission destination (reception side apparatus) is described separately from each other for the convenience of description, both of the functions of the apparatus may be incorporated, or only one of the functions may be incorporated.

Further, the system configuration that is a target in the embodiment of the present technology is not limited to them. For example, while FIG. 1 depicts an example of a communication system configured from four information processing apparatuses, the number of information processing apparatuses is not limited to this. Also the coupling scheme of a plurality of information processing apparatuses is not limited to the coupling schemes described above. For example, the embodiment of the present technology can be applied also to a network system in which a plurality of apparatuses are coupled in a coupling scheme other than the coupling schemes described above.

Example of Configuration of Information Processing Apparatus

Figure 2:
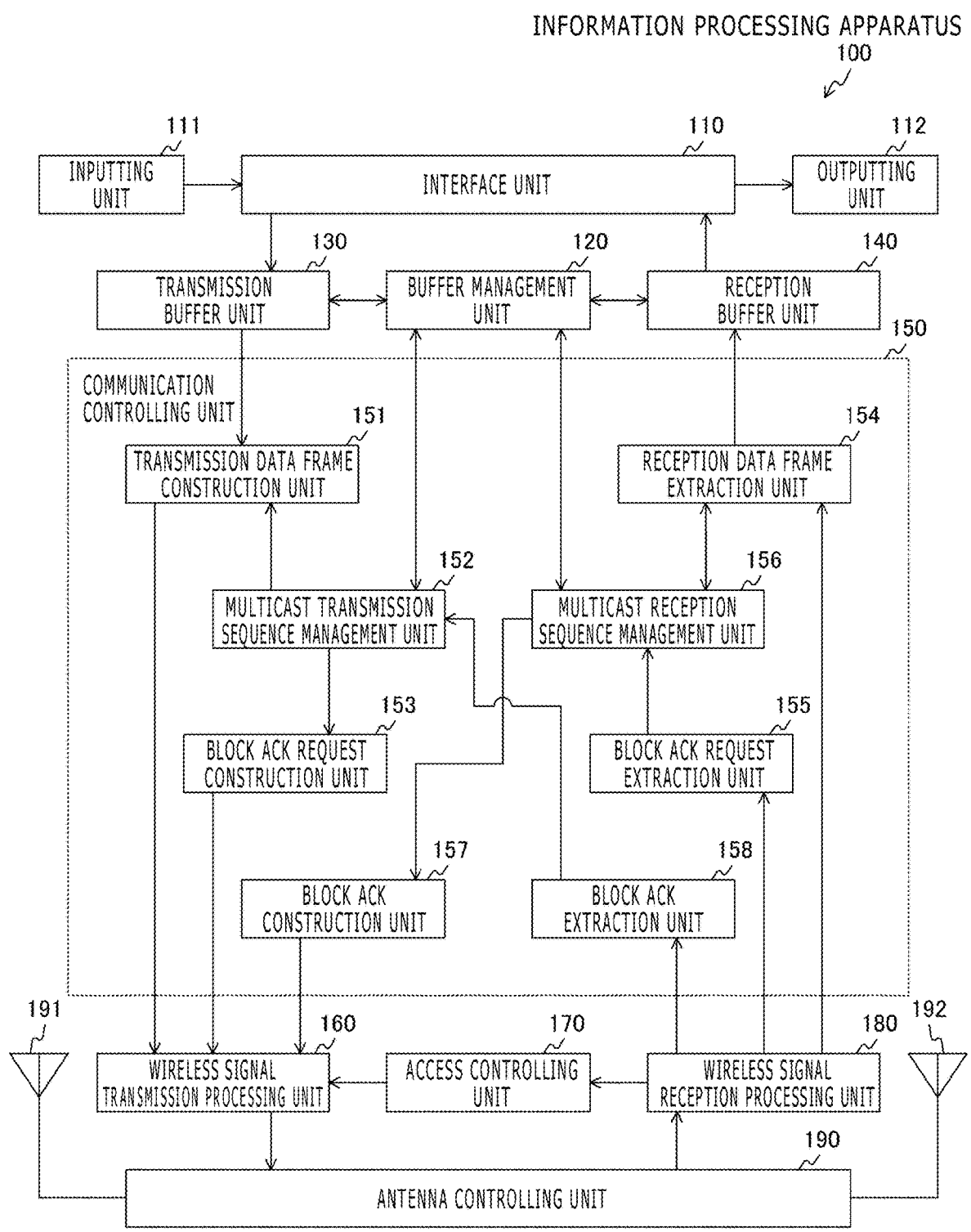
FIG. 2 is a block diagram depicting an example of a functional configuration of an information processing apparatus 100 in the embodiment of the present technology.

FIG. 2 is a block diagram depicting an example of a functional configuration of the information processing apparatus 100 in the embodiment of the present technology. It is to be noted that the functional configuration of the information processing apparatuses 101 to 103 may be substantially same as that of the information processing apparatus 100 or may be different from that of the information processing apparatus 100. For example, although the information processing apparatus 100 that functions as an access point is configured such that it is coupled to the Internet through a wired network or a wireless network, the information processing apparatuses 101 to 103 may be configured such that they are coupled to the Internet through a wireless network.

The information processing apparatus 100 includes an interface unit 110, an inputting unit 111, an outputting unit 112, a buffer management unit 120, a transmission buffer unit 130, a reception buffer unit 140, a communication controlling unit 150, a wireless signal transmission processing unit 160, an access controlling unit 170, a wireless signal reception processing unit 180, an antenna controlling unit 190, and antenna elements 191 and 192. Further, the communication controlling unit 150 includes a transmission data frame construction unit 151, a multicast transmission sequence management unit 152, a block ACK request construction unit 153, a reception data frame extraction unit 154, a block ACK request extraction unit 155, a multicast reception sequence management unit 156, a block ACK construction unit 157 and a block ACK extraction unit 158.

The interface unit 110 is an interface for receiving an information input from a user or outputting information to the user. For example, the interface unit 110 receives information from the inputting unit 111 as an input thereto and outputs the information to the outputting unit 112.

The inputting unit 111 acquires various data. For example, the inputting unit 111 is configured from an operation member (for example, a keyboard or a touch panel) for allowing an instruction of the user to be inputted. Further, for example, the inputting unit 111 is configured from an image pickup element for generating image data, a sound collection element for acquiring sound data and so forth.

The outputting unit 112 provides various data to the user. For example, the outputting unit 112 is configured from a display unit for displaying visual image information, a speaker for conveying information of sound, music and so forth to the user, an outputting apparatus for outputting a sense of touch such as vibration and so forth.

The buffer management unit 120 manages the utilization situation of an internal memory space disposed as a buffer.

The transmission buffer unit 130 is a buffer for storing data to be transmitted from the information processing apparatus 100 to a different apparatus.

The reception buffer unit 140 is a buffer for temporarily storing received data until data of a predetermined unit are collected.

The transmission data frame construction unit 151 constructs transmission data into a predetermined wireless transmission data frame format.

The multicast transmission sequence management unit 152 manages, when multicast transmission is to be performed, a sequence for the multicast transmission.

The block ACK request construction unit 153 constructs a frame when a block ACK request is to be transmitted.

The reception data frame extraction unit 154 extracts data as a predetermined data frame from a baseband signal.

The block ACK request extraction unit 155 extracts a block ACK request delivered from an apparatus of a transmission source (apparatus at the transmission side) after data reception.

The multicast reception sequence management unit 156 manages a reception sequence of received multicast data.

The block ACK construction unit 157 constructs a block ACK frame on the basis of a received block ACK request.

The block ACK extraction unit 158 extracts a block ACK frame from an apparatus at the reception side after data transmission.

The wireless signal transmission processing unit 160 converts a data frame to be transmitted as a baseband signal into a high frequency signal.

The access controlling unit 170 controls accessing in communication on a wireless transmission line in compliance with a predetermined wireless communication protocol.

The wireless signal reception processing unit 180 extracts a baseband signal from a high frequency signal received through the antenna elements 191 and 192.

The antenna controlling unit 190 controls the antenna elements 191 and 192 that transmit a signal on a wireless transmission line and receives a signal from the wireless transmission line.

The antenna elements 191 and 192 are antenna elements for transmitting or receiving a signal as a plurality of antenna elements.

Example of Configuration of Frame Format of Aggregate Data

Figure 3:
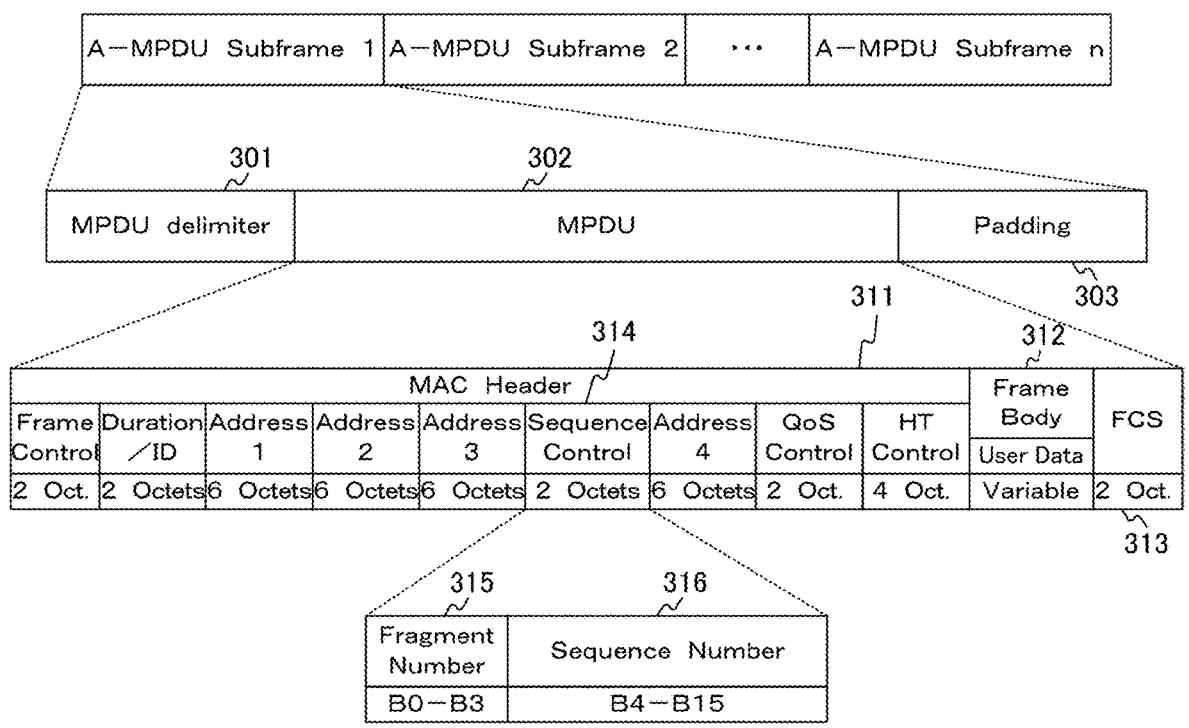
FIG. 3 is a view depicting an example of a configuration of a frame format of aggregate data exchanged between apparatuses in the embodiment of the present technology.

FIG. 3 is a view depicting an example of a configuration of a frame format of aggregate data exchanged between apparatuses in the embodiment of the present technology.

In FIG. 3, an example is depicted in which one physical layer burst (PHY (Physical Layer) burst) is configured as an MPDU (MAC Protocol Data Units) (A (Aggregation)-MPDU) subframe in which MPDUs that are a plurality of data are aggregated.

The A-MPDU subframe is configured from an MPDU delimiter 301, an MPDU 302 and padding 303.

The MPDU 302 is configured from a MAC header 311, a frame body 312, and an FCS (Frame Check Sequence) 313. Further, at a sequence control part (Sequence Control 314) of the MAC header 311, a fragment number (Fragment Number 315) and a sequence number (Sequence Number 316) are placed.

One data included in one MPDU is transmitted with one sequence number added thereto in this manner.

Example of Configuration of Frame Format of Block ACK Request

Figure 4:
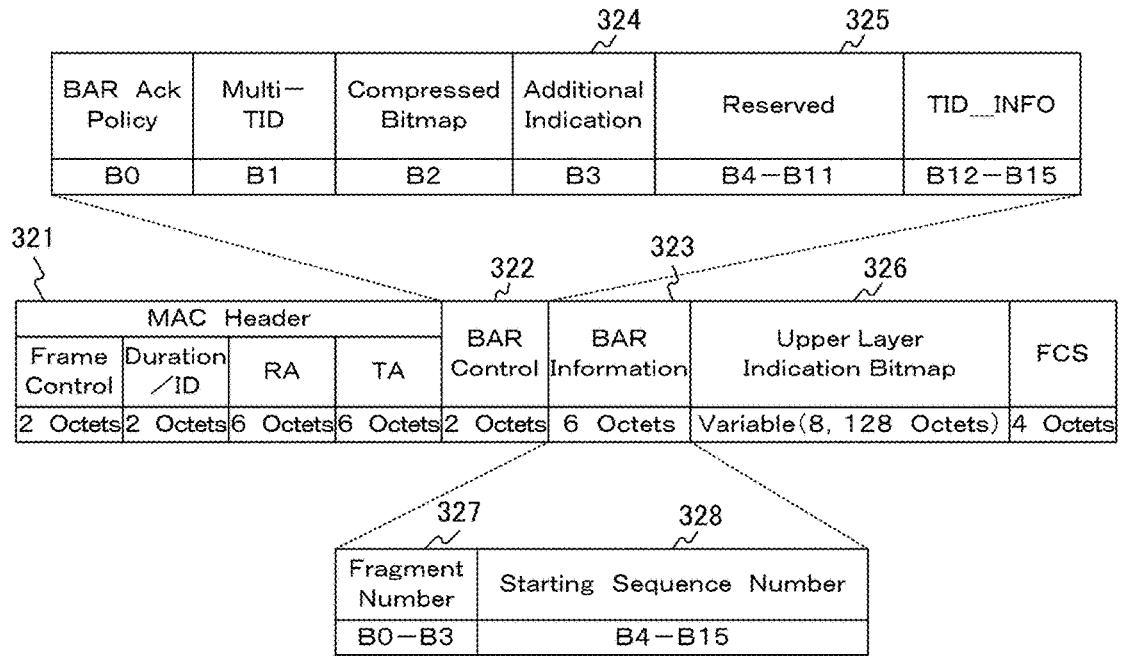
FIG. 4 is a view depicting an example of a configuration of a frame format of a block ACK request exchanged between apparatuses in the embodiment of the present technology.

FIG. 4 is a view depicting an example of a configuration of a frame format of the block ACK request that is exchanged between apparatuses in the embodiment of the present technology.

The frame format of the block ACK request depicted in FIG. 4 can be defined as a format similar to a block ACK request frame defined in the IEEE802.11-2012 standard.

In particular, an Additional Indication (additional indication bit) 324 is newly provided at part of a BAR Control (block ACK request control field) 322 disposed next to a MAC header 321. In other words, the Additional Indication 324 is provided newly at part of a Reserved region 325 of the BAR Control 322.

Further, where the bit of the Additional Indication 324 is 1, this represents the frame format used in the embodiment of the present technology. On the other hand, where the bit of the Additional Indication 324 is 0, this represents the conventional frame format.

Meanwhile, in the frame format of the block ACK request depicted in FIG. 4, an Upper Layer Indication Bitmap (upper layer notification bitmap) 326 is disposed. In this field, an upper layer notification bitmap is described in the form of a variable length bitmap.

For example, in the Upper Layer Indication Bitmap 326, a bitmap of 8 octets (64 bits) as the variable length is accommodated. Alternatively, a bitmap of 128 octets may be accommodated. The length of the bitmap part may be changed, for example, in response to a set value of a compressed bitmap (Compressed Bitmap) of the BAR Control 322.

Further, in the Upper Layer Indication Bitmap 326, a sequence number to be received by an apparatus of the transmission destination is described. In particular, from within a sequence number corresponding to a Fragment Number 327 and a Starting Sequence Number 328 of BAR Information (block ACK request information field) 323, the entirety or part corresponding to a bitmap of a predetermined length is described.

It is to be noted that description of the other fields than the fields described here is omitted because equal values to those in conventional applications of the block ACK request frame can be set.

Figure 5:
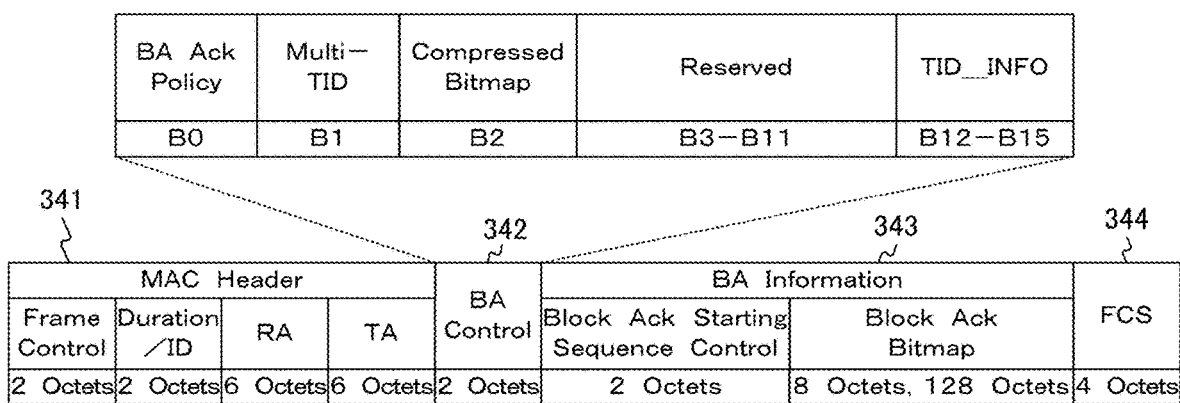
FIG. 5 is a view depicting an example of a configuration of a frame format of a block ACK exchanged between apparatuses in the embodiment of the present technology.

Example of Configuration of Frame Format of Block ACK FIG. 5 is a view depicting an example of a configuration of a frame format of the block ACK exchanged between apparatuses in the embodiment of the present technology.

The block ACK frame depicted in FIG. 5 is configured from a MAC header 341, a BA Control (block ACK control) 342, BA Information (block ACK information) 343 and an FCS 344.

In the region of the BA Information 343, a sequence number of data received correctly by an apparatus of the transmission destination is stored as information of the bitmap form until a predetermined size (8 octets or 128 octets) is reached. For example, if the block ACK request frame depicted in FIG. 4 is received, then an apparatus of the transmission destination can specify the sequence number of correctly received data on the basis of a start sequence number included in the block ACK request frame. Then, the apparatus of the transmission destination records the sequence number of the correctly received data into the region of the BA Information 343.

Example of Setup for Multicast Communication

Figure 6:
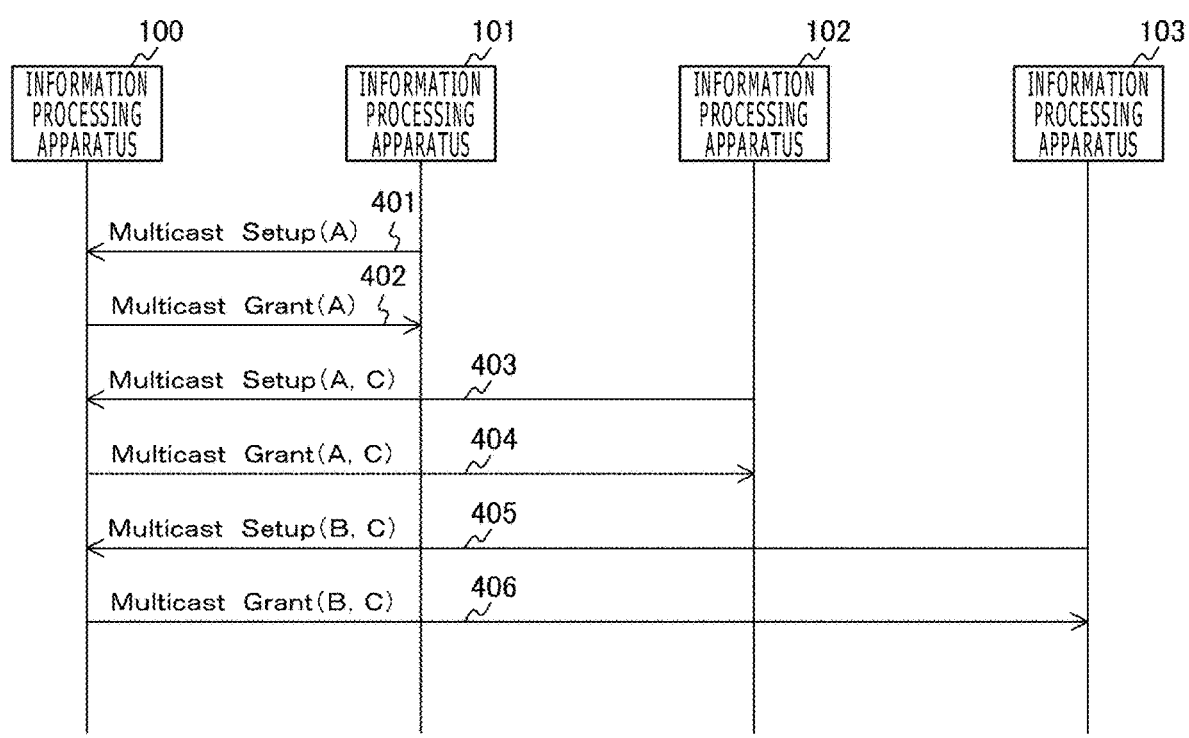
FIG. 6 is a sequence chart depicting an example of a communication process when setup for multicast communication is performed between apparatuses in the embodiment of the present technology.

FIG. 6 is a sequence chart depicting an example of a communication process when setup for multicast communication is performed between apparatuses in the embodiment of the present technology.

FIG. 6 depicts an example in which the information processing apparatus 100 is an apparatus of the transmission source of multicast communion (apparatus at the transmission side) and each of the information processing apparatuses 101 to 103 is an apparatus of the transmission destination of multicast communication (apparatus at the reception side). This similarly applies also to FIGS. 8 to 10. Further, three multicast communications are provided as a service and are individually referred to as multicast communications A to C.

Further, FIG. 6 depicts an example in which the apparatus of the transmission destination of each multicast communication notifies the apparatus of the transmission source of the multicast communication of a reception setup request (Multicast Setup) on the basis of an input of the multicast communication service requested by a user of the apparatus. FIG. 6 further depicts an example in which, when the apparatus of the transmission source of the reception setup request accepts provision of the service, the apparatus of the transmission source returns a reception confirmation notification (Multicast Grant).

First, the information processing apparatus 101 transmits a reception setup request (Multicast Setup (A)) of a multicast communication A to the information processing apparatus 100 (401). In response to this, the information processing apparatus 100 returns a reception confirmation notification (Multicast Grant (A)) of the multicast communication A to the information processing apparatus 101 (402).

Further, the information processing apparatus 102 transmits a reception setup request (Multicast Setup (A, C)) for the multicast communication A and the multicast communication C to the information processing apparatus 100 (403). In response to this, the information processing apparatus 100 returns a reception confirmation notification (Multicast Grant (A, C)) of the multicast communication A and the multicast communication C to the information processing apparatus 102 (404).

Further, the information processing apparatus 103 transmits a reception setup request (Multicast Setup (B, C)) for the multicast communication B and the multicast communication C to the information processing apparatus 100 (405). In response to this, the information processing apparatus 100 returns a reception confirmation notification (Multicast Grant (B, C)) of the multicast communication B and the multicast communication C to the information processing apparatus 103 (406).

Such exchanges as described above are performed in principle when a demand for communication occurs between the apparatuses. Further, not a sequence number of multicast communication but a sequence number corresponding to each apparatus is used to perform exchanges of information between the apparatuses.

Example of Management of Transmission Sequence Number

Figure 7:
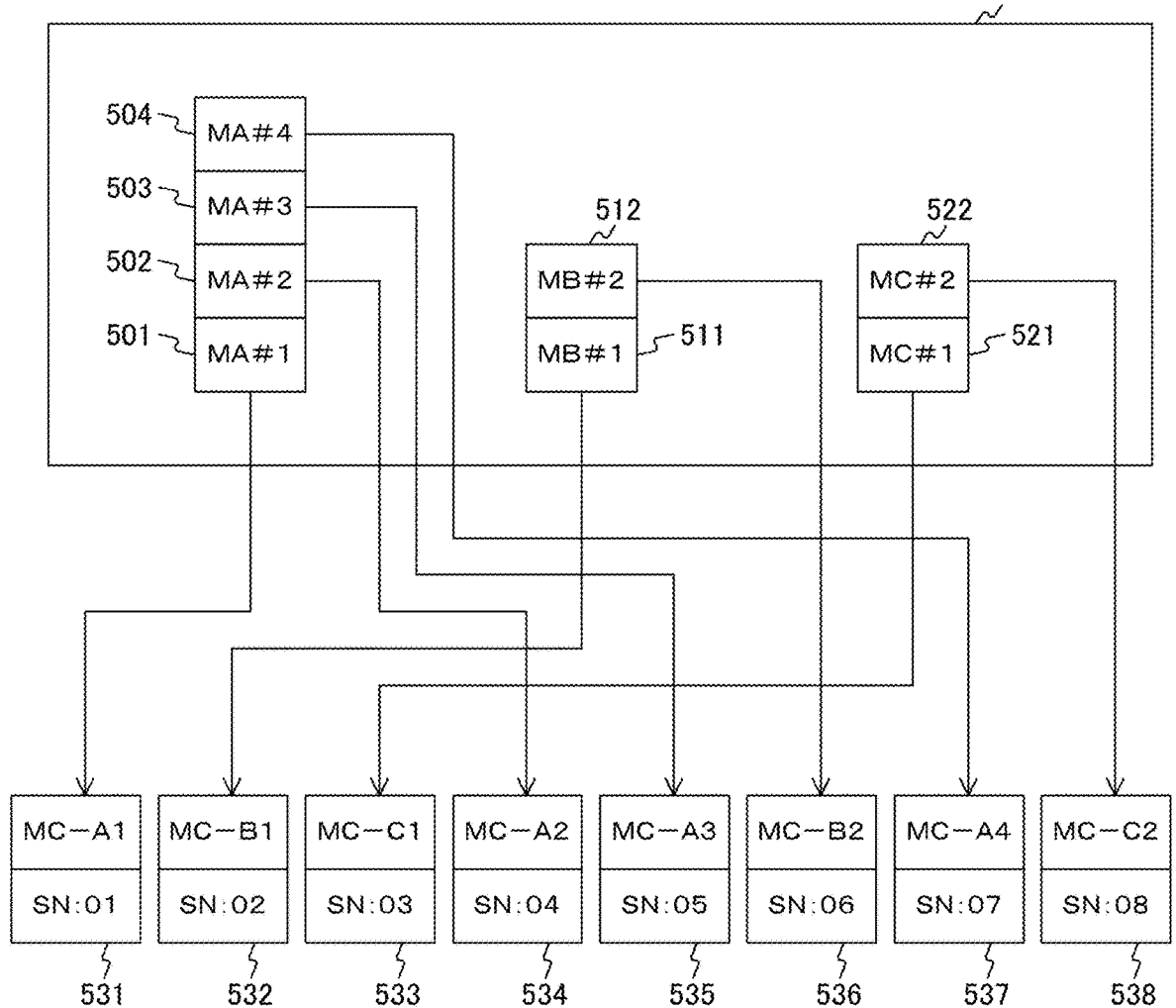
FIG. 7 is a view schematically depicting an example of management of transmission sequence numbers by the information processing apparatus 100 in the embodiment of the present technology.

FIG. 7 is a view schematically depicting an example of management of transmission sequence numbers by the information processing apparatus 100 in the embodiment of the present technology.

At the upper side in FIG. 7, the transmission buffer unit 130 is schematically represented by a rectangle. Further, data stored in the transmission buffer unit 130 are schematically indicated by rectangles to the inside of which contents of the same (reference characters MA to MC representative of multicast communications and serial numbers #1 to #4 of data) are described. Meanwhile, at the lower side in FIG. 7, data transmitted from the information processing apparatus 100 are schematically indicated by rectangles to the inside of which contents of the same are described. At an upper stage in the rectangles at the lower side of FIG. 7, reference characters for identifying data (reference characters MC-A1 to MC-A4, MC-B1, MC-B2, MC-C1 and MC-C2 representative of multicast communications) are indicated. Further, at a lower stage in the rectangles depicted at the lower side in FIG. 7, sequence numbers (SN) 01 to 08 added to data are indicated.

Further, in FIG. 7, a case is supposed in which data of the multicast communication A, data of the multicast communication B and data of the multicast communication C are accumulated in the transmission buffer unit 130. In particular, four data sequences (first data 501 to fourth data 504) transmitted by the multicast communication A are accumulated in the transmission buffer unit 130. Further, two data sequences (first data 511 and second data 512) transmitted by the multicast communication B are accumulated in the transmission buffer unit 130. Further, two data sequences (first data 521 and second data 522) transmitted by the multicast communication C are accumulated in the transmission buffer unit 130.

Further, in FIG. 7, relationships between the data accumulated in the transmission buffer unit 130 and data to be transmitted are individually connected to each other by arrow marks.

Further, in FIG. 7, an example is depicted in which the first data (MC-A1) 531 of the multicast communication A is transmitted with the sequence number "01" added thereto and the first data (MC-B1) 532 of the multicast communication B is transmitted with the sequence number "02" added thereto. Further, an example is depicted in which the first data (MC-C1) 533 of the multicast communication C is transmitted with the sequence number "03" added thereto and the second data (MC-A2) 534 of the multicast communication A is transmitted with the sequence number "04" added thereto. Further, an example is depicted in which the third data (MC-A3) 535 of the multicast communication A is transmitted with the sequence number "05" added thereto and the second data (MC-B2) 536 of the multicast communication B is transmitted with the sequence number "06" added thereto. Furthermore, an example is depicted in which the fourth data (MC-A4) 537 of the multicast communication A is transmitted with the sequence number "07" added thereto and the second data (MC-C2) 538 of the multicast communication C is transmitted with the sequence number "08" added thereto.

Here, the sequence numbers "01" to "08" are recorded into the Sequence Number 316 depicted in FIG. 3.

Example in Which Plural Multicast Communications Are Performed

Figure 8:
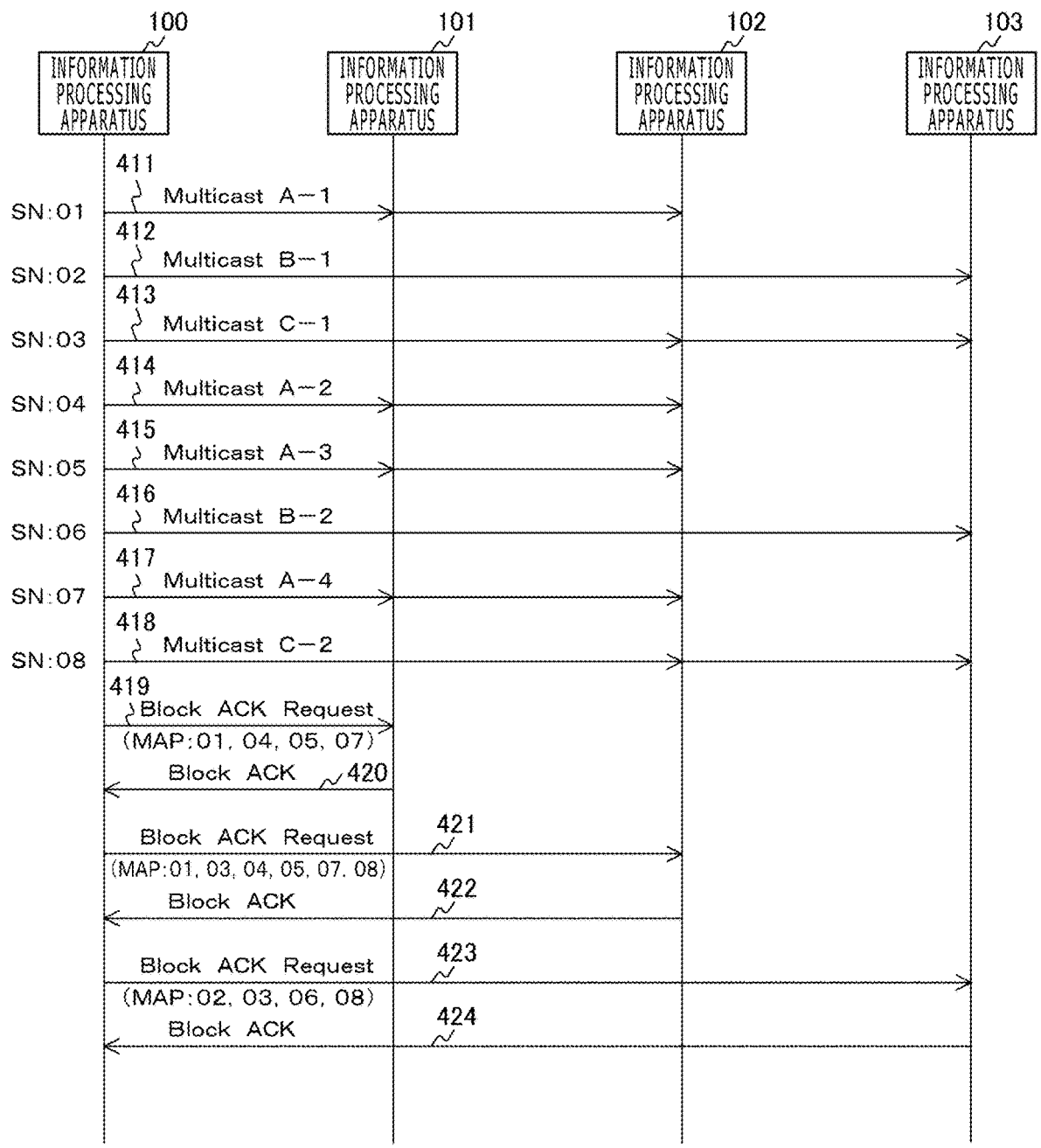
FIG. 8 is a sequence chart depicting an example of a communication process when the information processing apparatus 100 in the embodiment of the present technology performs a plurality of multicast communications.

FIG. 8 is a sequence chart depicting an example of a communication process when the information processing apparatus 100 in the embodiment of the present technology performs a plurality of multicast communications.

FIG. 8 depicts an example of a case in which a reception setup request for multicast communication is issued and reception setup for multicast communication is completed as depicted in FIG. 6. In other words, an example in which data of the multicast communication A is transmitted from the information processing apparatus 100 to the information processing apparatus 101 and the information processing apparatus 102 is depicted. Similarly, an example in which data of the multicast communication B is transmitted from the information processing apparatus 100 to the information processing apparatus 103 and data of the multicast communication C is transmitted from the information processing apparatus 100 to the information processing apparatus 102 and the information processing apparatus 103 is depicted.

First, the information processing apparatus 100 transmits the first data (first data 531 depicted in FIG. 7) of the multicast communication A with the sequence number "01" added thereto to the information processing apparatus 101 and the information processing apparatus 102 (411). The information processing apparatus 101 and the information processing apparatus 102 receive the data (first data 531 depicted in FIG. 7).

Then, the information processing apparatus 100 transmits the first data of the multicast communication B (first data 532 depicted in FIG. 7) with the sequence number "02" added thereto to the information processing apparatus 103 (412). The information processing apparatus 103 receives the data (first data 532 depicted in FIG. 7).

Then, the information processing apparatus 100 transmits the first data of the multicast communication C (first data 533 depicted in FIG. 7) with the sequence number "03" added thereto to the information processing apparatus 102 and the information processing apparatus 103 (413). The information processing apparatus 102 and the information processing apparatus 103 receive the data (first data 533 depicted in FIG. 7).

Then, the information processing apparatus 100 transmits the second data of the multicast communication A (first data 534 depicted in FIG. 7) with the sequence number "04" added thereto to the information processing apparatus 101 and the information processing apparatus 102 (414). The information processing apparatus 101 and the information processing apparatus 102 receive the data (second data 534 depicted in FIG. 7).

Then, the information processing apparatus 100 transmits the third data of the multicast communication A (first data 535 depicted in FIG. 7) with the sequence number "05" added thereto to the information processing apparatus 101 and the information processing apparatus 102 (415). The information processing apparatus 101 and the information processing apparatus 102 receive the data (first data 535 depicted in FIG. 7).

Then, the information processing apparatus 100 transmits the second data of the multicast communication B (first data 536 depicted in FIG. 7) with the sequence number "06" added thereto to the information processing apparatus 103 (416). The information processing apparatus 103 receives the data (first data 536 depicted in FIG. 7).

Then, the information processing apparatus 100 transmits the seventh data of the multicast communication A (first data 537 depicted in FIG. 7) with the sequence number "07" added thereto to the information processing apparatus 101 and the information processing apparatus 102 (417). The information processing apparatus 101 and the information processing apparatus 102 receive the data (first data 537 depicted in FIG. 7).

Then, the information processing apparatus 100 transmits the second data of the multicast communication C (first data 538 depicted in FIG. 7) with the sequence number "08" added thereto to the information processing apparatus 102 and the information processing apparatus 103 (418). The information processing apparatus 102 and the information processing apparatus 103 receive the data (first data 538 depicted in FIG. 7).

Then, the information processing apparatus 100 transmits a block ACK request (Block ACK Request) destined for the information processing apparatus 101 with information of a sequence map (01, 04, 05 and 07) added thereto (419). In particular, the information processing apparatus 100 sets the bit of the Additional Indication 324 depicted in FIGS. 4 to 1, and records information of the sequence map (01, 04, 05 and 07) into the Upper Layer Indication Bitmap 326.

Further, the information processing apparatus 101 receives a block ACK request destined for the information processing apparatus 101 from the information processing apparatus 100. In this case, the information processing apparatus 101 can specify the sequence numbers of multicast data whose reception is required on the basis of the information of the sequence map included in the received block ACK request. Then, the information processing apparatus 101 compares the information of the sequence map included in the block ACK request and sequence numbers included in the received data of the multicast communication A with each other. Then, if they coincide with each other, then the information processing apparatus 101 can decide that data (multicast data) of the multicast communication A is complete. In this case, the information processing apparatus 101 can deliver the data of the multicast communication A to an upper layer.

On the other hand, if the information of the sequence map included in the block ACK request and the sequence numbers included in the received data of the multicast communication A do not coincide with each other, then the information processing apparatus 101 can decide that the data of the multicast communication A is not complete. In this case, the information processing apparatus 101 returns a block ACK in which information regarding data received successfully is recorded (420). In this manner, the information processing apparatus 101 returns a block ACK in response to the request (420).

Then, the information processing apparatus 100 transmits a block ACK request (Block ACK Request) destined for the information processing apparatus 102 with information of a sequence map (01, 03, 04, 05, 07 and 08) added thereto (421). In particular, the information processing apparatus 100 sets the bit of the Additional Indication 324 depicted in FIGS. 4 to 1 and records the information of the sequence map (01, 03, 04, 05, 07 and 08) into the Upper Layer Indication Bitmap 326.

Further, the information processing apparatus 102 receives a block ACK request destined for the information processing apparatus 102 from the information processing apparatus 100. Since processes after the reception are similar to those of the information processing apparatus 101, detailed description of them is omitted herein. In particular, the information processing apparatus 102 specifies sequence numbers of multicast data whose reception is required on the basis of information of the sequence map included in the received block ACK request. Then, if the information processing apparatus 102 decides that data (multicast data) of the multicast communications A and C is complete, then it delivers the data of the multicast communications A and C to an upper layer. On the other hand, if the information processing apparatus 102 decides that the data of the multicast communications A and C is not complete, then it returns a block ACK in which information regarding data received successfully is recorded (422).

Then, the information processing apparatus 100 transmits a block ACK request (Block ACK Request) destined for the information processing apparatus 103 with information of a sequence map (02, 03, 06 and 08) added thereto (423). In particular, the information processing apparatus 100 sets the bit of the Additional Indication 324 depicted in FIGS. 4 to 1 and records the information of the sequence map (02, 03, 06 and 08) into the Upper Layer Indication Bitmap 326.

Further, the information processing apparatus 103 receives a block ACK request destined for the information processing apparatus 103 from the information processing apparatus 100. Since processes after the reception are similar to those by the information processing apparatuses 101 and 102, detailed description of the same is omitted herein. In particular, the information processing apparatus 103 specifies sequence numbers of multicast data whose reception is required on the basis of the information of the sequence map included in the received block ACK request. Then, if the information processing apparatus 103 decides that the data (multicast data) of the multicast communications B and C is complete, then it delivers the data of the multicast communications B and C to the upper layer. On the other hand, when the information processing apparatus 103 decides that the data of the multicast communications B and C is not complete, then it returns a block ACK in which information regarding data received successfully is recorded (424).

Here, apparatuses of the transmission destination (apparatus at the reception side) can conventionally specify data destined for the own apparatus (data to be received) on the basis of address information included in the multicast frames. However, if an apparatus of the transmission destination (apparatus at the reception side) cannot receive data correctly, then it cannot grasp whether or not the data is data to be received.

Further, also in regard to data of a series of multicast communications, conventionally an apparatus of the transmission destination (apparatus at the reception side) can specify the tail of the data, for example, on the basis of a More data flag at the header part. However, an apparatus of the transmission destination (apparatus at the reception side) cannot grasp that data whose reception is not required exists midway. Therefore, for example, if an apparatus of the transmission destination (apparatus at the reception side) that receives the multicast communication A cannot receive the sequence numbers "02" and "06" whose reception is not required originally, then it decides from the sequence numbers that data of them is not received. Then, the apparatus of the transmission destination (apparatus at the reception side) will keep on waiting for re-sending.

In contrast, in the embodiment of the present technology, information of sequence numbers of data to be collected is added to a block ACK request frame. Consequently, the information processing apparatus 101 can grasp that only data of the sequence numbers "01," "04," "05" and "07" may be collected. Therefore, there is no necessity for the information processing apparatus 101 to keep on waiting data whose reception is not required anymore.

Figure 9:
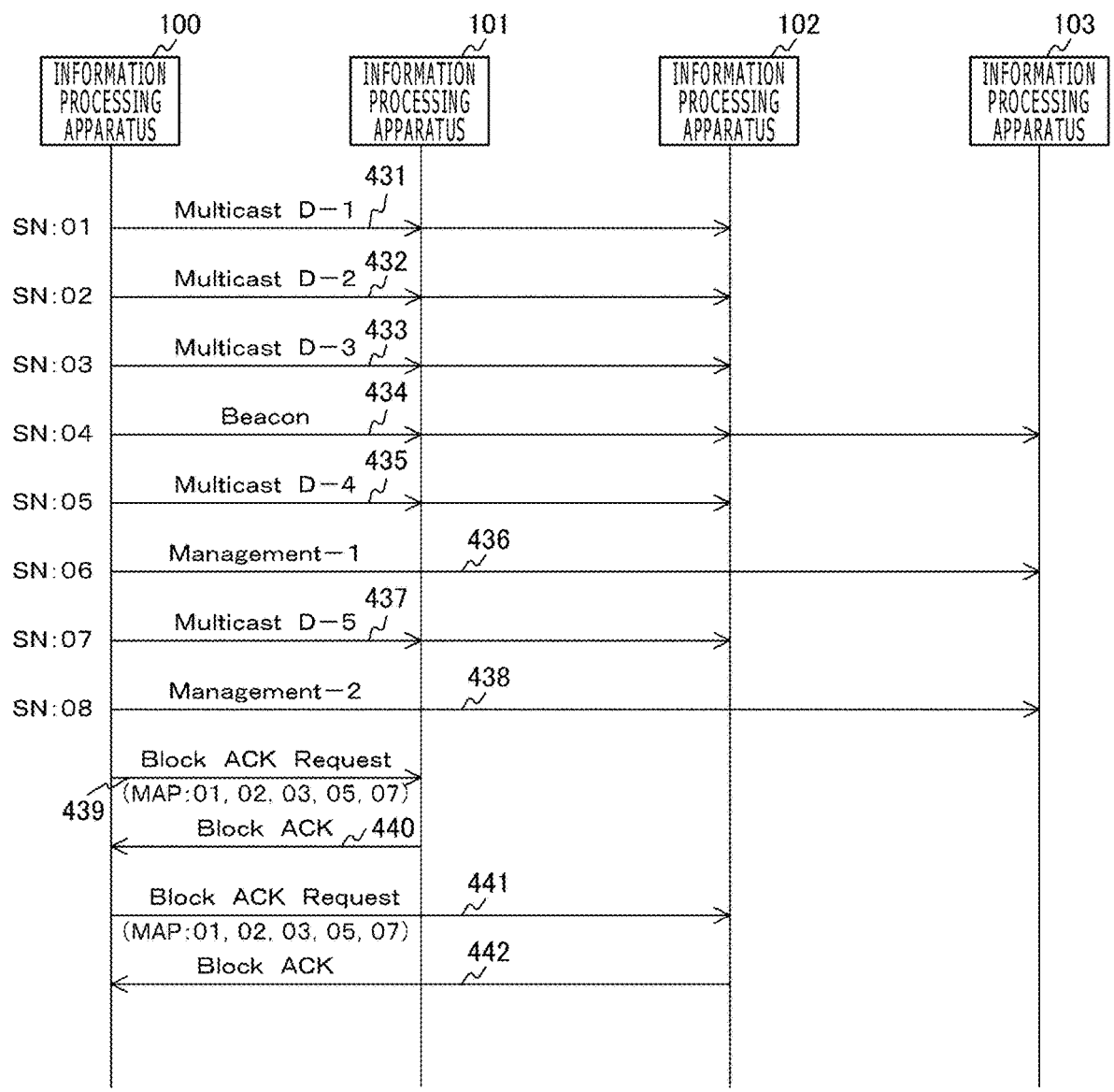
FIG. 9 is a sequence chart depicting an example of a communication process when the information processing apparatus 100 in the embodiment of the present technology performs multicast communication.

Example in which Multicast Communication in which Different Frame is Mixed is Performed FIG. 9 is a sequence chart depicting an example of a communication process when the information processing apparatus 100 in the embodiment of the present technology performs multicast communication.

In FIG. 9, an example is depicted in which, while the information processing apparatus 100 performs multicast communication, it performs transmission of a different frame (for example, a beacon frame or a management frame). In particular, an example is depicted in which, while the information processing apparatus 100 transmits data of multicast communication D to the information processing apparatus 101 and the information processing apparatus 102, it transmits a beacon frame and a management frame.

First, the information processing apparatus 100 transmits the first data of the multicast communication D with the sequence number "01" added thereto to the information processing apparatus 101 and the information processing apparatus 102 (431). The information processing apparatus 101 and the information processing apparatus 102 receive the data.

Then, the information processing apparatus 100 transmits the second data of the multicast communication D with the sequence number "02" added thereto to the information processing apparatus 101 and the information processing apparatus 102 (432). The information processing apparatus 101 and the information processing apparatus 102 receive the data.

Then, the information processing apparatus 100 transmits the third data of the multicast communication D with the sequence number "03" added thereto to the information processing apparatus 101 and the information processing apparatus 102 (433). The information processing apparatus 101 and the information processing apparatus 102 receive the data.

Then, the information processing apparatus 100 transmits a beacon frame with the sequence number "04" added thereto (434). The information processing apparatus 101, the information processing apparatus 102 and the information processing apparatus 103 receive the beacon frame.

Then, the information processing apparatus 100 transmits the fourth data of the multicast communication D with the sequence number "05" added thereto to the information processing apparatus 101 and the information processing apparatus 102 (435). The information processing apparatus 101 and the information processing apparatus 102 receive the data.

Then, the information processing apparatus 100 transmits the first management frame for the information processing apparatus 103 with the sequence number "06" added thereto to the information processing apparatus 103 (436). The information processing apparatus 103 receives the management frame.

Then, the information processing apparatus 100 transmits the fifth data of the multicast communication D with the sequence number "07" added thereto to the information processing apparatus 101 and the information processing apparatus 102 (437). The information processing apparatus 101 and the information processing apparatus 102 receive the data.

Then, the information processing apparatus 100 transmits the second management frame for the information processing apparatus 103 with the sequence number "08" added thereto to the information processing apparatus 103 (438). The information processing apparatus 103 receives the management frame.

Then, the information processing apparatus 100 transmits a block ACK request (Block ACK Request) destined for the information processing apparatus 101 with information of a sequence map (01, 02, 03, 05 and 07) added thereto (439). In particular, the information processing apparatus 100 sets the bit of the Additional Indication 324 depicted in FIGS. 4 to 1 and records the information of the sequence map (01, 02, 03, 05 and 07) into the Upper Layer Indication Bitmap 326.

The information processing apparatus 101 receives the block ACK request destined for the information processing apparatus 101 from the information processing apparatus 100. Since processes after the reception are similar to those depicted in FIG. 8, detailed description of them is omitted herein. In particular, the information processing apparatus 101 specifies sequence numbers of multicast data whose reception is required on the basis of the information of a sequence map included in the received block ACK request. Then, if the information processing apparatus 101 decides that the data (multicast data) of the multicast communication D is complete, then it delivers the data of the multicast communication D to the upper layer. On the other hand, if the information processing apparatus 101 decides that data of the multicast communication D is not complete, then it returns a block ACK in which information regarding data received successfully is recorded (440).

Then, the information processing apparatus 100 transmits a block ACK request (Block ACK Request) destined for the information processing apparatus 102 with information of a sequence map (01, 02, 03, 05 and 07) added thereto (441). In particular, the information processing apparatus 100 sets the bit of the Additional Indication 324 depicted in FIGS. 4 to 1 and records the information of the sequence map (01, 02, 03, 05 and 07) into the Upper Layer Indication Bitmap 326.

The information processing apparatus 102 receives the block ACK request destined for the information processing apparatus 102 from the information processing apparatus 100. Since processes after the reception are similar to those depicted in FIG. 8, detailed description of them is omitted herein. In particular, the information processing apparatus 102 specifies sequence numbers of multicast data whose reception is required on the basis of the information of the sequence map included in the received block ACK request. Then, if the information processing apparatus 102 decides that the data (multicast data) of the multicast communication D is complete, then it delivers the data of the multicast communication D to the upper layer. On the other hand, if the information processing apparatus 102 decides that data of the multicast communication D is not complete, then it returns a block ACK in which the information regarding data received successfully is recorded (442).

Figure 10:
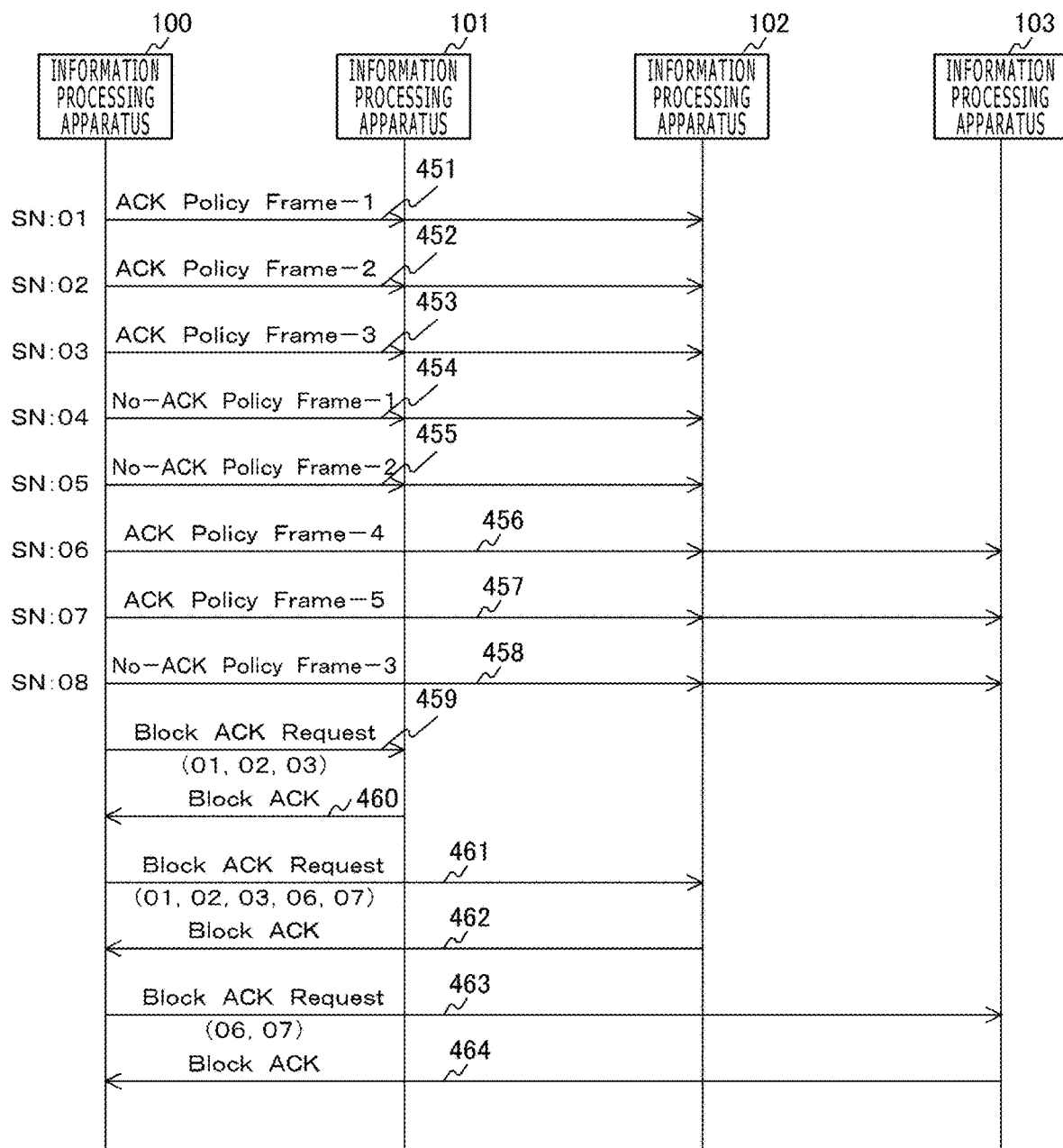
FIG. 10 is a sequence chart depicting an example of a communication process when the information processing apparatus 100 in the embodiment of the present technology performs multicast communication.

Example in which Data Frame that Requires ACK and Data Frame of No-ACK are Mixed in Transmission FIG. 10 is a sequence chart depicting an example of a communication process when the information processing apparatus 100 in the embodiment of the present technology performs multicast communication.

In FIG. 10, an example is depicted in which, when the information processing apparatus 100 performs multicast communication, a data frame that requires ACK and a data frame of No-ACK are mixed in transmission.

First, the information processing apparatus 100 transmits the first data for multicast communication to which an ACK policy is set with the sequence number "01" added thereto to the information processing apparatus 101 and the information processing apparatus 102 (451). The information processing apparatus 101 and the information processing apparatus 102 receive the data.

Then, the information processing apparatus 100 transmits the second data for multicast communication to which an ACK policy is set with the sequence number "02" added thereto to the information processing apparatus 101 and the information processing apparatus 102 (452). The information processing apparatus 101 and the information processing apparatus 102 receive the data.

Then, the information processing apparatus 100 transmits the third data for multicast communication to which an ACK policy is set with the sequence number "03" added thereto to the information processing apparatus 101 and the information processing apparatus 102 (453). The information processing apparatus 101 and the information processing apparatus 102 receive the data.

Then, the information processing apparatus 100 transmits the first data for multicast communication to which a No-ACK policy is set with the sequence number "04" added thereto to the information processing apparatus 101 and the information processing apparatus 102 (454). The information processing apparatus 101 and the information processing apparatus 102 receive the data.

Then, the information processing apparatus 100 transmits the second data for multicast communication to which a No-ACK policy is set with the sequence number "05" added thereto to the information processing apparatus 101 and the information processing apparatus 102 (455). The information processing apparatus 101 and the information processing apparatus 102 receive the data.

Then, the information processing apparatus 100 transmits the fourth data for multicast communication to which an ACK policy is set with the sequence number "06" added thereto to the information processing apparatus 102 and the information processing apparatus 103 (456). The information processing apparatus 102 and the information processing apparatus 103 receive the data.

Then, the information processing apparatus 100 transmits the fifth data for multicast communication to which an ACK policy is set with the sequence number "07" added thereto to the information processing apparatus 102 and the information processing apparatus 103 (457). The information processing apparatus 102 and the information processing apparatus 103 receive the data.

Then, the information processing apparatus 100 transmits the third data for multicast communication to which a No-ACK policy is set with the sequence number "08" added thereto to the information processing apparatus 102 and the information processing apparatus 103 (458). The information processing apparatus 102 and the information processing apparatus 103 receive the data.

Then, the information processing apparatus 100 transmits a block ACK request (Block ACK Request) destined for the information processing apparatus 101 with information of a sequence map (01, 02 and 03) added thereto (459). In particular, the information processing apparatus 100 sets the bit of the Additional Indication 324 depicted in FIGS. 4 to 1 and records the information of the sequence map (01, 02 and 03) into the Upper Layer Indication Bitmap 326.

Further, the information processing apparatus 101 receives a block ACK request destined for the information processing apparatus 101 from the information processing apparatus 100. Since processes after the reception are similar to those depicted in FIG. 8, detailed description of them is omitted herein. In particular, the information processing apparatus 101 specifies sequence numbers of multicast data whose reception is required on the basis of the information of the sequence map included in the received block ACK request. Then, if the information processing apparatus 101 decides that data (multicast data) of the multicast communication to which the ACK policy is set are complete, then it delivers the data to the upper layer. On the other hand, if the information processing apparatus 101 decides that the data of the multicast communication to which the ACK policy is set are not complete, then it returns a block ACK in which information regarding data received successfully is recorded (460).

Then, the information processing apparatus 100 transmits a block ACK request (Block ACK Request) destined for the information processing apparatus 102 with information of a sequence map (01, 02, 03, 06 and 07) added thereto (461). In particular, the information processing apparatus 100 sets the bit of the Additional Indication 324 depicted in FIGS. 4 to 1 and records the information of the sequence map (01, 02, 03, 06 and 07) into the Upper Layer Indication Bitmap 326.

Further, the information processing apparatus 102 receives a block ACK request destined for the information processing apparatus 102 from the information processing apparatus 100. Since processes after the reception are similar to those depicted in FIG. 8, detailed description of them is omitted herein. In particular, the information processing apparatus 102 specifies sequence numbers of multicast data whose reception is required on the basis of the information of the sequence map included in the received block ACK request. Then, if the information processing apparatus 102 decides that data (multicast data) of the multicast communication to which the ACK policy is set are complete, then it delivers the data to the upper layer. On the other hand, if the information processing apparatus 102 decides that the data of the multicast communication to which the ACK policy is set are not complete, then it returns a block ACK in which information regarding data received successfully is recorded (462).

Then, the information processing apparatus 100 transmits a block ACK request (Block ACK Request) destined for the information processing apparatus 103 with information of a sequence map (06 and 07) added thereto (463). In particular, the information processing apparatus 100 sets the bit of the Additional Indication 324 depicted in FIGS. 4 to 1 and records the information of the sequence map (06 and 07) into the Upper Layer Indication Bitmap 326.

Further, the information processing apparatus 103 receives a block ACK request destined for the information processing apparatus 103 from the information processing apparatus 100. Since processes after the reception are similar to those depicted in FIG. 8, detailed description of them is omitted herein. In particular, the information processing apparatus 103 specifies sequence numbers of multicast data whose reception is required on the basis of the information of the sequence map included in the received block ACK request. Then, if the information processing apparatus 103 decides that data (multicast data) for the multicast communication to which the ACK policy is set are complete, then it delivers the data to the upper layer. On the other hand, if the information processing apparatus 103 decides that the data for the multicast communication to which the ACK policy is set are not complete, then it returns a block ACK in which information regarding data received successfully is recorded (464).

Example of Operation of Information Processing Apparatus Now, an Example of Operation of the Information Processing Apparatus is Described.

Figure 11:
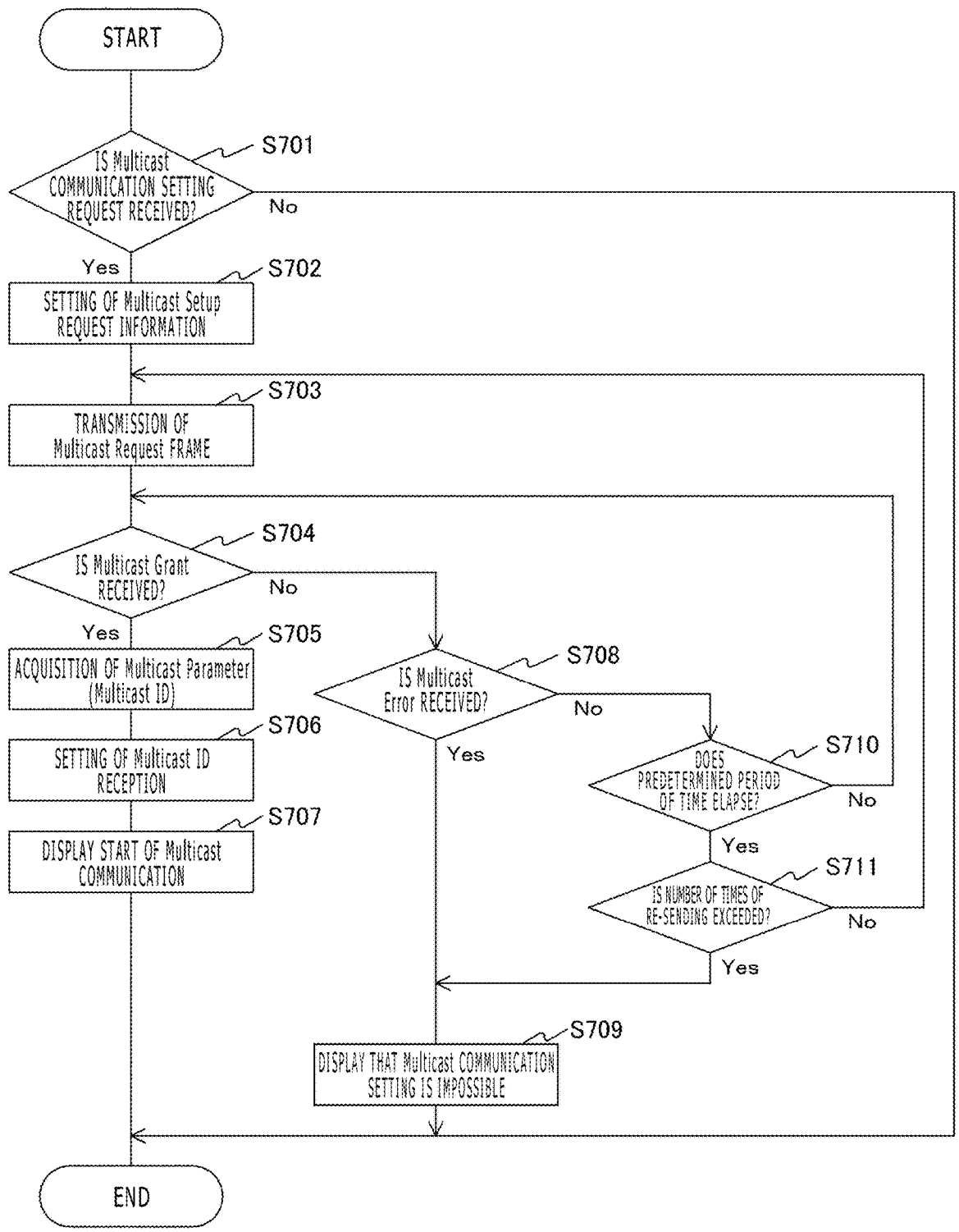
FIG. 11 is a flow chart depicting an example of a processing procedure of a setting request process for multicast communication by another information processing apparatus 101 in the embodiment of the present technology.

Example of Setting Request for Multicast Communication (Example of Operation of Transmission Destination) FIG. 11 is a flow chart depicting an example of a processing procedure of a setting request process for multicast communication by the information processing apparatus 101 in the embodiment of the present technology.

In FIG. 11, an example is depicted in which the information processing apparatus 101 that is an apparatus of a transmission destination (apparatus at the reception side) issues a setting request for multicast communication. For example, while a setting screen image of an application is displayed on the display unit of the information processing apparatus 101, when a predetermined user operation is performed on the setting screen image, the information processing apparatus 101 issues a setting request for multicast communication. The application is, for example, an application for receiving and displaying moving image information based on a video distribution broadcasting service or an application for receiving and displaying an image when a game is performed. For example, in the application for receiving and displaying moving image information based on a video distribution broadcasting service, if a user selects a desired content (for example, a broadcasting station), then the user can view the desired content.

First, the control unit of the information processing apparatus 101 decides whether or not it receives a setting request for multicast communication (step S701). If a setting request for multicast communication is not received (step S701), then the control unit of the information processing apparatus 101 ends the operation of the setting request process for multicast communication.

If the control unit of the information processing apparatus 101 receives a setting request for multicast communication (step S701), then it acquires a parameter necessary for multicast communication and sets setup information (Multicast Setup) (step S702). It is to be noted that the parameter necessary for multicast communication is, for example, a size or the like of a reception buffer unit provided in the own apparatus.

Then, the control unit of the information processing apparatus 101 transmits a multicast request (Multicast Request) frame to the transmission source of multicast communication (information processing apparatus 100) (step S703).

Then, the control unit of the information processing apparatus 101 decides whether or not acknowledgement of multicast communication (Multicast Grant) is received from the transmission source of the multicast communication (information processing apparatus 100) (step S704). If acknowledgement of multicast communication (Multicast Grant) is received (step S704), then the control unit of the information processing apparatus 101 acquires information with which the multicast communication to be received can be identified as a multicast parameter (step S705). The information with which the multicast communication to be received can be identified is, for example, a multicast address (multicast identifier (Multicast ID)).

Then, the control unit of the information processing apparatus 101 stores the acquired information (for example, a multicast address) as address information to be received into a storage unit and sets reception of multicast data to which the address is added (step S706).

Then, the control unit of the information processing apparatus 101 controls the display unit to display that the requested setting for multicast communication is completed and data reception is started (step S707). Consequently, the user can grasp readily, for example, that multicast communication is started.

On the other hand, if acknowledgement of multicast communication is not received (step S704), then the control unit of the information processing apparatus 101 decides whether or not an error of multicast communication (Multicast Error) is received from the information processing apparatus 100 (step S708). For example, when the capacity of the buffer used for communication is insufficient, when, although multicast communication that needs to pay is requested, payment is not performed or in a like case, the multicast communication becomes an error.

If an error of multicast communication (Multicast Error) is received (step S708), then the control unit of the information processing apparatus 101 controls the display unit to display that the requested setting for multicast communication is impossible (step S709). Consequently, the user can grasp readily that, for example, the multicast communication results in error and is not started.

On the other hand, if an error of the multicast communication is not received (step S708), then the control unit of the information processing apparatus 101 decides whether or not a predetermined period of time elapses (step S710). Then, if the predetermined period of time does not elapse (Step S710), then the processing returns to step S704.

If the predetermined period of time elapses (step S710), then the control unit of the information processing apparatus 101 decides whether or not a predetermined number of times of re-sending is exceeded (step S711). Then, if the predetermined re-sending time number is not exceeded (step S711), then the processing returns to step S703. On the other hand, if the predetermined re-sending time number is exceeded (step S711), then the control unit of the information processing apparatus 101 controls the display unit to display that the requested setting for multicast communication is impossible (step S709).

In this manner, when acknowledgement of multicast communication (Multicast Grant) is not received, re-sending of a multicast request (Multicast Request) frame is repeated until the predetermined re-sending time number is reached.

Example of Setting Request for Multicast Communication (Example of Operation of Transmission Source)

Figure 12:
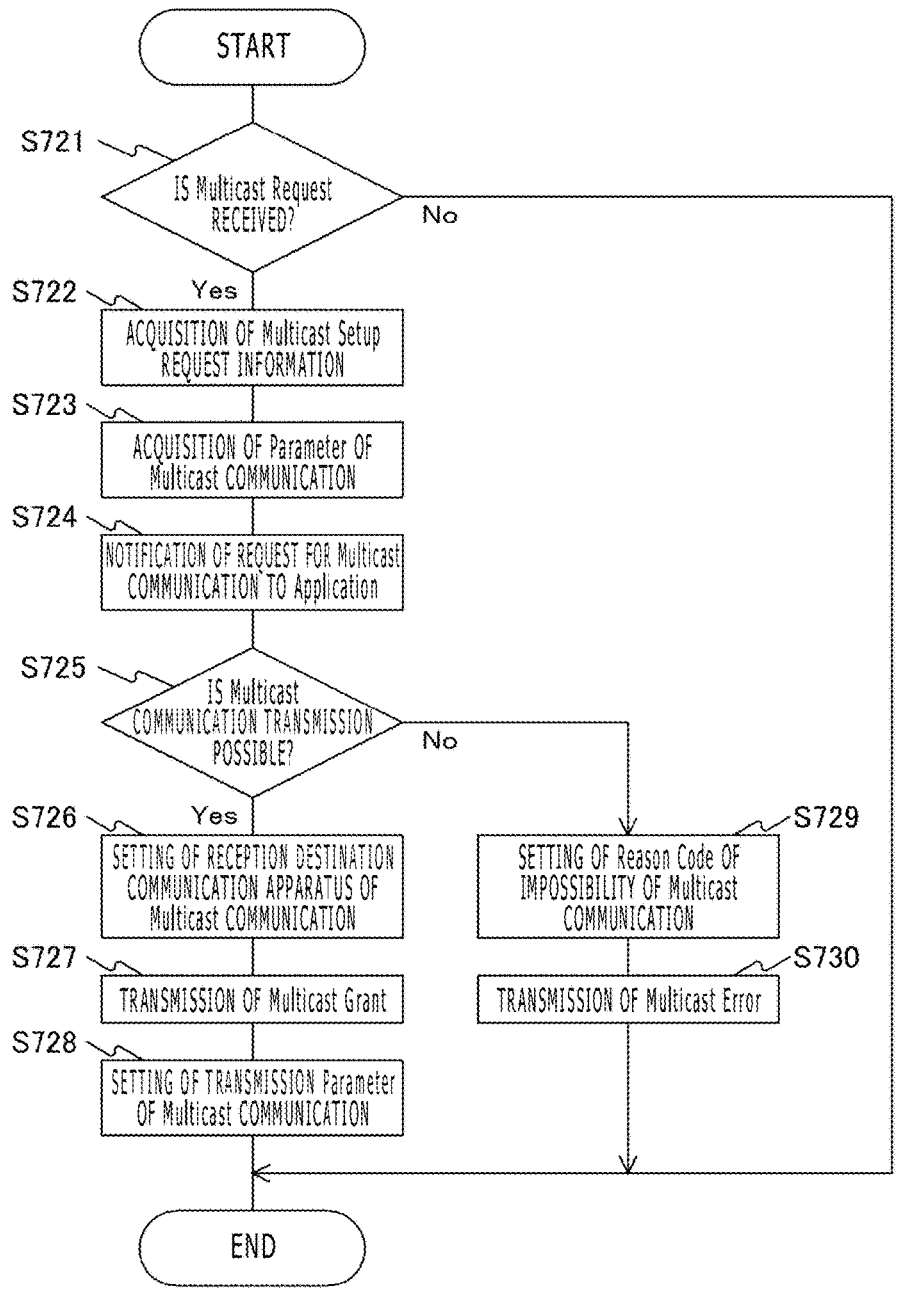
FIG. 12 is a flow chart depicting an example of a processing procedure of a setting request process for multicast communication by the information processing apparatus 100 in the embodiment of the present technology.

FIG. 12 is a flow chart depicting an example of a processing procedure of a setting request process for multicast communication by the information processing apparatus 100 in the embodiment of the present technology.

First, the communication controlling unit 150 of the information processing apparatus 100 decides whether or not a setting request (Multicast Request) frame for multicast communication is received from a different apparatus (apparatus of the transmission destination) (step S721). If a setting request frame for multicast communication is not received (step S721), then operation of the setting request process for multicast communication is ended.

If a setting request frame for multicast communication is received (step S721), then the communication controlling unit 150 acquires setup information (Multicast Setup) described in the received frame (step S722). Then, the communication controlling unit 150 acquires a transmission parameter for multicast communication of the own apparatus (step S723).

Then, the communication controlling unit 150 notifies an application of an upper layer of a request for multicast communication (step S724). Also it is supposed, for example, that information from an external apparatus is acquired and the acquired information is multicast transmitted. For example, where the information processing apparatus 100 is coupled to a server through a network (for example, the Internet), it is supposed that information from the server (for example, moving image information based on a video distribution broadcasting service) is acquired and the acquired information is multicast transmitted. In this case, the communication controlling unit 150 notifies the server of a request for multicast communication (step S724).

Then, the communication controlling unit 150 decides whether or not a notification that multicast communication is possible is received from the application of the upper layer (step S725). For example, when, although multicast communication that needs to pay is requested, payment is not performed, when the bandwidth is insufficient or in a like case, it is decided that multicast communication is impossible.

If a notification that multicast communication is possible (step S725), then the communication controlling unit 150 sets the apparatus from which the setting request frame for multicast communication is transmitted as an apparatus of the transmission destination in multicast communication (step S726).

Then, the communication controlling unit 150 transmits acknowledgement of multicast communication (Multicast Grant) to the apparatus of the transmission destination (step S727). Then, the communication controlling unit 150 sets a transmission parameter for multicast communication (step S728).

On the other hand, if a notification that multicast communication is impossible is received (step S725), then the communication controlling unit 150 sets a reason code (Reason Code) by which multicast communication is impossible (S729). Then, the communication controlling unit 150 transmits a multicast communication error (Multicast Error) to the apparatus from which the setting request frame for multicast communication has been transmitted (step S730).

Example of Multicast Communication (Example of Operation of Transmission Source)

Figure 13:
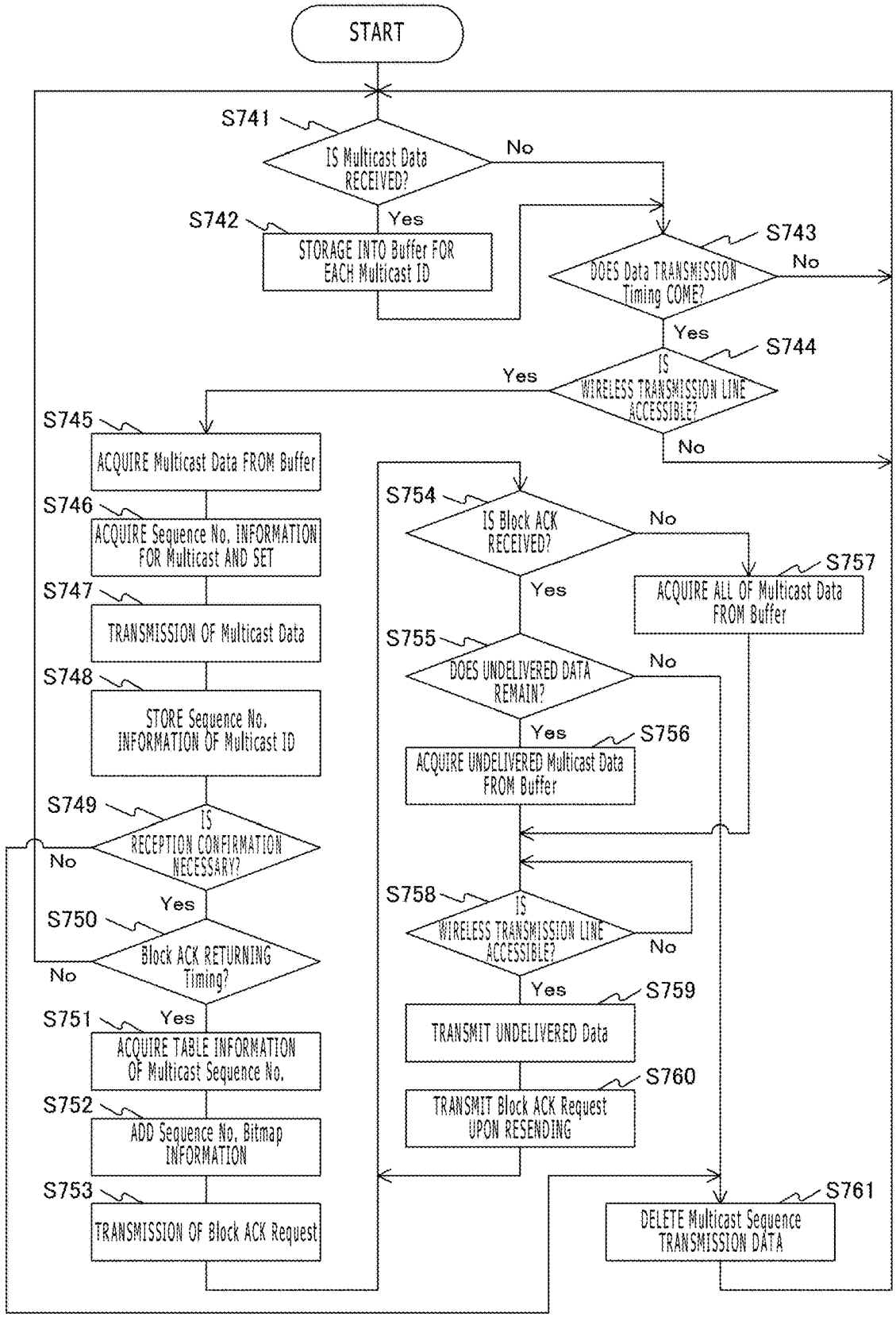
FIG. 13 is a flow chart depicting an example of a processing procedure of a multicast communication process by the information processing apparatus 100 in the embodiment of the present technology.

FIG. 13 is a flow chart depicting an example of a processing procedure for a multicast communication process by the information processing apparatus 100 in the embodiment of the present technology.

In FIG. 13, an example in a case in which, where multicast communication is set, the information processing apparatus 100 transmits individual multicast data is depicted.

First, the communication controlling unit 150 of the information processing apparatus 100 decides whether or not multicast data is received from an application through the interface unit 110 (step S741). If multicast data is received from the application (step S741), then the communication controlling unit 150 stores the received multicast data for each multicast identifier (Multicast ID) into the transmission buffer unit 130 (step S742). On the other hand, when multicast data is not received from the application (step S741), then the processing advances to step S743.

Further, the communication controlling unit 150 (multicast transmission sequence management unit 152) decides whether or not a timing at which multicast data is to be transmitted comes (step S743). If a timing at which multicast data is to be transmitted does not come (step S743), then the processing returns to step S741.

If the timing at which multicast data is to be transmitted comes (step S743), then the access controlling unit 170 decides whether or not it can access the apparatus of the transmission destination (step S744). For example, if different communication is not performed along the wireless transmission line, then the access controlling unit 170 can decide that it can access the apparatus of the transmission destination. If the access controlling unit 170 cannot access the apparatus of the transmission destination (step S744), then the processing returns to step S741.

If the access controlling unit 170 can access the apparatus of the transmission destination (step S744), then the communication controlling unit 150 (transmission data frame construction unit 151) acquires multicast transmission data from the transmission buffer unit 130 (step S745). Then, the transmission data frame construction unit 151 acquires information of sequence numbers for multicast from the multicast transmission sequence management unit 152 and sets the information as transmission sequence numbers of the multicast transmission data (step S746). Then, the wireless signal transmission processing unit 160 transmits the multicast data (step S747).

Then, the communication controlling unit 150 (multicast transmission sequence management unit 152) stores the transmitted sequence numbers as transmission sequence number information of the multicast identifier (Multicast ID) (step S748).

Then, the communication controlling unit 150 (block ACK request construction unit 153) decides reception confirmation as ACK information from the apparatus of the transmission destination regarding the multicast communication is necessary (step S749). If reception confirmation is not necessary (step S749), then the processing advances to step S761.

If reception confirmation is necessary (step S749), then the communication controlling unit 150 (block ACK request construction unit 153) decides whether or not the present point of time is a timing at which a block ACK is to be returned (step S750). If the present point of time is not a timing at which a block ACK is to be transmitted (step S750), then the processing returns to step S741, and the transmission process and so forth of data are repeated till a timing at which a block ACK request is to be issued. It is to be noted that, although a single timing is set to a plurality of multicast communications, timings different from each other may be set for individual multicast communications or for a plurality of apparatuses of the transmission destination.

If the present point of time is a timing at which a block ACK is to be returned (step S750), then the block ACK request construction unit 153 acquires table information of the sequence numbers transmitted by the multicast communication from the multicast transmission sequence management unit 152 (step S751). Then, the block ACK request construction unit 153 designates a start sequence number for asking returning as a block ACK and adds bitmap information of the sequence numbers necessary as an ACK by multicast communication to the block ACK request frame (step S752). Then, the wireless signal transmission processing unit 160 transmits the block ACK request frame to the apparatus of the transmission destination (step S753).

Then, the communication controlling unit 150 (block ACK extraction unit 158) decides whether or not a block ACK frame is received (step S754). If a block ACK frame is received (step S754), then the communication controlling unit 150 (block ACK execution unit 158) decides whether or not data of a sequence number that indicates an unsent state exists on the basis of the received block ACK frame (step S755). It is to be noted that, where a block ACK frame is to be received from a plurality of apparatuses of transmission destinations, it may be decided whether or not unsent data exists every time.

If data of a sequence number that indicates an unsent state exists (step S755), this is conveyed to the multicast transmission sequence management unit 152. Then, the transmission data frame construction unit 151 acquires the multicast data in an unsent state from the transmission buffer unit 130 (step S756).

On the other hand, if a large amount of unsent data remains after, when a block ACK frame is not received at the predetermined timing, a block ACK request is transmitted by a predetermined number of times or in a block ACK frame of a plurality of apparatuses of the transmission destination (step S754), then the transmission data frame construction unit 151 acquires all of the series of transmitted multicast data from the transmission buffer unit 130 (step S757).

Then, the access controlling unit 170 decides whether or not it can access the apparatus of the transmission destination (step S758). For example, if any other communication is not performed along the wireless transmission line, then the access controlling unit 170 can decide that it can access the apparatus of the transmission destination. If the access controlling unit 170 cannot access the apparatus of the transmission destination (step S758), then it continuously performs monitoring.

If the access controlling unit 170 can access the apparatus of the transmission destination (step S758), then the wireless signal transmission processing unit 160 re-transmits the unsent data (step S759). Then, the wireless signal transmission processing unit 160 transmits also a block ACK request upon resending constructed by the block ACK request construction unit 153 (step S760).

On the other hand, if data of a sequence number that indicates an unsent state does not exist, or if a predetermined period of time elapses and unsent data is not recognized anymore (step S755), then the communication controlling unit 150 deletes the data that have been stored into the transmission buffer unit 130 by a series of sequences of multicast communication (step S761).

In this manner, when a block ACK is received and all data are delivered or no reception confirmation is required, the data having been stored into the transmission buffer by a series of sequences of multicast communication are deleted (step S761). It is to be noted that steps S745 to S753 are an example of a control procedure described in the claims.

In this manner, the communication controlling unit 150 of the information processing apparatus 100 performs control for transmitting, to a different apparatus, request information (for example, a block ACK request frame) for requesting the different apparatus for a confirmation response (for example, a block ACK) to a plurality of data transmitted to the different apparatus. In this case, the communication controlling unit 150 performs control for adding and transmitting notification information (for example, map information) to and together with request information (for example, a block ACK request frame) to the different apparatus. Here, the notification information is, for example, information (for example, map information) regarding a sequence number at least other than the start sequence number from among sequence numbers corresponding to a plurality of data.

Further, the communication controlling unit 150 can add and transmit notification information (for example, map information) regarding a sequence number corresponding to specific data from among a plurality of data to and together with request information (for example, a block ACK request frame) to a different apparatus. Here, the specific data can be, for example, at least one of data destined for the information processing apparatus 100, data to be passed to the upper layer, data of multicast communication to be received and data other than parity data.

Further, the communication controlling unit 150 can add and transmit notification information relating to successive sequence numbers or intermittent sequence numbers from among sequence numbers corresponding to a plurality of data to and together with request information to a different apparatus.

Example of Multicast Communication (Example of Operation of Transmission Destination)

Figure 14:
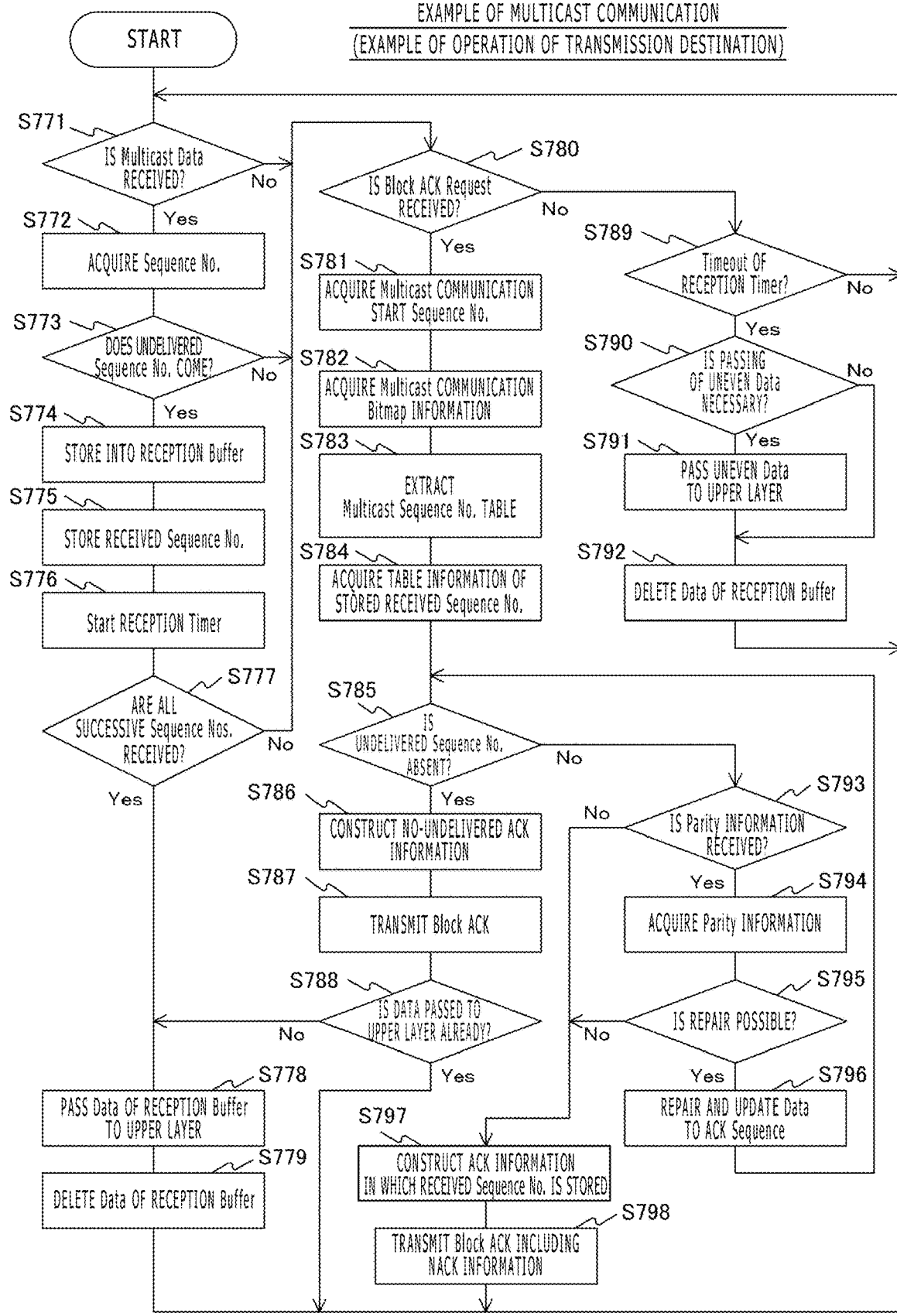
FIG. 14 is a flow chart depicting an example of a processing procedure of a multicast communication process by the information processing apparatus 101 in the embodiment of the present technology.

FIG. 14 is a flow chart depicting an example of a processing procedure of a multicast communication process by the information processing apparatus 101 in the embodiment of the present technology.

FIG. 14 depicts an example of a case in which, where multicast communication is set, apparatuses of a transmission destination collect individual multicast data.

First, the control unit of the information processing apparatus 101 (corresponding to the reception data frame extraction unit 154 depicted in FIG. 2) decides whether or not multicast data of a multicast identifier (Multicast ID) set such that the multicast data is to be received by the own apparatus is received (step S771). If multicast data of the multicast identifier set such that the multicast data is to be received by the own apparatus is not received (step S771), then the processing advances to step S780.

If the multicast data is received (step S771), then the control unit of the information processing apparatus 101 (corresponding to the reception data frame extraction unit 154 depicted in FIG. 2) acquires sequence numbers added to the frame (step S772). Then, the control unit of the information processing apparatus 101 (corresponding to the multicast reception sequence management unit 156 depicted in FIG. 2) decides whether or not there exists an unsent sequence number that does not overlap (step S773). Then, if an unsent sequence number that does not overlap does not exist (step S773), then the processing advances to step S780.

If an unsent sequence number that does not overlap exists (step S773), then the control unit of the information processing apparatus 101 (corresponding to the reception data frame extraction unit 154 depicted in FIG. 2) stores the data into the reception buffer unit (corresponding to the reception buffer unit 140 depicted in FIG. 2) (step S774).

Then, the control unit of the information processing apparatus 101 (corresponding to the multicast reception sequence management unit 156 depicted in FIG. 2) stores the information of the received sequence numbers in an associated relationship with the multicast identifier (Multicast ID) (step S775). Then, the control unit of the information processing apparatus 101 (corresponding to the multicast reception sequence management unit 156 depicted in FIG. 2) activates a reception timer (step S776).

Then, the control unit of the information processing apparatus 101 (corresponding to the multicast reception sequence management unit 156 depicted in FIG. 2) decides whether or not reception of all data of the successive sequence numbers (for example, from the start data to the last data) results in success (step S777). If reception of all data of the successive sequence numbers does not result in success (step S777), then the processing advances to step S780.

If reception of all data of the successive sequence numbers results in success (step S777), then the control unit of the information processing apparatus 101 (corresponding to the communication controlling unit 150 depicted in FIG. 2) passes the data of the reception buffer unit to the application of the upper layer (step S778). Then, the control unit of the information processing apparatus 101 (corresponding to the communication controlling unit 150 depicted in FIG. 2) deletes the data of the reception buffer unit (step S779).

Further, the control unit of the information processing apparatus 101 (corresponding to the block ACK request extraction unit 155 depicted in FIG. 2) decides whether or not a block ACK request destined for the own apparatus is received (step S780). If the block ACK request is received (step S780), then the control unit of the information processing apparatus 101 (corresponding to the multicast reception sequence management unit 156 depicted in FIG. 2) acquires a start sequence number of the multicast communication destined for the own apparatus (step S781).

Then, the control unit of the information processing apparatus 101 (corresponding to the multicast reception sequence management unit 156 depicted in FIG. 2) acquires bitmap information indicative of sequence numbers to be collected beginning with the start sequence number relating to the multicast communication (step S782). Then, the control unit of the information processing apparatus 101 (corresponding to the multicast reception sequence management unit 156 depicted in FIG. 2) extracts, where reception of a plurality of multicast communications is set, a table of sequence numbers of multicast managed for the individual multicast communications (step S783).

Then, the control unit of the information processing apparatus 101 (corresponding to the multicast reception sequence management unit 156 depicted in FIG. 2) acquires, for the individual multicast communications, table information of reception sequence numbers added to the multicast data received by the own apparatus (step S784).

Then, the control unit of the information processing apparatus 101 (corresponding to the multicast reception sequence management unit 156 depicted in FIG. 2) compares the table of sequence numbers for the individual multicast communications and the table of reception sequence numbers added to the multicast data received by the own apparatus with each other. Then, the control unit of the information processing apparatus 101 (corresponding to the multicast reception sequence management unit 156 depicted in FIG. 2) decides on the basis of a result of the comparison whether or not a sequence number of unsent multicast data is absent (step S785). It is to be noted that, where a plurality of multicast communications are received, the decision described above may be performed for each multicast communication.

If a sequence number of unsent multicast data is absent (step S785), then the control unit of the information processing apparatus 101 (corresponding to the block ACK construction unit 157 depicted in FIG. 2) constructs ACK information representing that no unsent data remains (step S786). Then, the control unit of the information processing apparatus 101 (corresponding to the wireless signal transmission processing unit 160 depicted in FIG. 2) transmits a block ACK frame to the apparatus of the transmission source (step S787).

Then, the control unit of the information processing apparatus 101 (corresponding to the communication controlling unit 150 depicted in FIG. 2) confirms whether or not the data stored in the reception buffer unit have been passed to the application of the upper layer (step S788). Then, if the data stored in the reception buffer unit have not been passed to the application of the upper layer (step S788), then the processing returns to step S778, at which the data stored in the reception buffer unit are passed to the application of the upper layer.

If a sequence number of unsent multicast data exists (step S785), then the control unit of the information processing apparatus 101 (corresponding to the communication controlling unit 150 depicted in FIG. 2) decides whether or not data transmitted as parity information is received (step S793). If data transmitted as parity information is received (step S793), then the control unit of the information processing apparatus 101 (corresponding to the communication controlling unit 150 depicted in FIG. 2) acquires the parity information (step S794). On the other hand, if data transmitted as parity information is not received (step S793), then the processing advances to step S797.

Then, the control unit of the information processing apparatus 101 (corresponding to the communication controlling unit 150 depicted in FIG. 2) decides whether or not repair of data of the unset sequence number is possible (step S795). Then, if repair of data of the unsent sequence number is possible (step S795), then the control unit of the information processing apparatus 101 repairs the data and updates the same as a received ACK sequence number (step S796). Then, confirmation of the unsent sequence number is performed again.

On the other hand, if repair of data of the unset sequence number is impossible (step S795), then the unsent data is finally determined. Therefore, the control unit of the information processing apparatus 101 (corresponding to the block ACK construction unit 157 depicted in FIG. 2) constructs block ACK information in which the received sequence numbers are described (step S797). Then, the control unit of the information processing apparatus 101 (corresponding to the wireless signal transmission processing unit 160 depicted in FIG. 2) transmits the block ACK frame including NACK information (step S798). In this manner, when the block ACK frame is returned (step S798), the processing returns to step S771 in order to prepare for re-sending of the unsent data.

In this manner, where parity information is not received or where repair of data cannot be performed, since unsent data is finally determined, block ACK information in which received sequence numbers are described is constructed (step S797).

On the other hand, if a block ACK request destined for the own apparatus is not received before predetermined time (step S780), then reception is continued until timeout of the reception timer set at step S776 occurs (step S789).

If timeout of the reception timer occurs (step S789), then the control unit of the information processing apparatus 101 (corresponding to the communication controlling unit 150 depicted in FIG. 2) decides whether or not it is necessary to pass uneven data to the application of the upper layer (step S790). Then, if it is unnecessary to pass the uneven data to the application of the upper layer (step S790), then the processing advances to step S792.

On the other hand, if it is necessary to pass the uneven data to the application of the upper layer (step S790), the control unit of the information processing apparatus 101 (corresponding to the communication controlling unit 150 depicted in FIG. 2) passes the uneven data to the application of the upper layer (step S791). Then, the control unit of the information processing apparatus 101 (corresponding to the communication controlling unit 150 depicted in FIG. 2) deletes the uneven data from among the data stored in the reception buffer unit (step S792). It is to be noted that steps S781 to S785 are an example of the decision procedure described in the claims. Further, steps S789 and 778 are an example of the decision procedure described in the claims.

In this manner, the information processing apparatus 101 receives request information (for example, a block ACK request frame) to which notification information (for example, map information) is added from a different apparatus. In this case, the control unit of the information processing apparatus 101 performs control for deciding on the basis of the notification information (for example, map information) whether or not unsent data remains from among data to be received by the own apparatus from among a plurality of data. Then, the control unit of the information processing apparatus 101 performs, when unsent data does not exist, control for passing a plurality of data to the upper layer.

Further, when unsent data exists, the control unit of the information processing apparatus 101 performs control for transmitting a confirmation response (for example, a block ACK frame), to which information regarding a sequence number for specifying the unsent data is added, to a different apparatus. In this case, when the unsent data disappears as a result of re-sending of the unsent data from the different apparatus, the control unit of the information processing apparatus 101 performs control for passing a plurality of data to the upper layer.

It is to be noted that, when a plurality of data having successive sequence numbers are received without an error, the control unit of the information processing apparatus 101 may pass a plurality of data to the upper layer without receiving request information (for example, a block ACK request frame). Further, where data of parity information is included in a plurality of data, the control unit of the information processing apparatus 101 may handle the unsent data that is repaired on the basis of the parity information as data received already.

Here, conventionally an apparatus of the transmission destination cannot decide whether or not a block ACK is necessary if it does not refer to the ACK policy of data actually sent thereto. Therefore, the apparatus of the transmission destination cannot decide whether or not returning of block ACK for data whose reception results in failure is required. Further, where data of a plurality of multicasts are transmitted, since a sequence number of a beacon signal that is a management frame is used in common, the block ACK frame must be sent back within one continuous transmission opportunity (TXOP (Transmission Opportunity)).

In this manner, conventionally if an apparatus of the transmission destination that utilizes a block ACK for reception confirmation of a data frame of multicast fails to receive a beacon, then it decides that undelivered data of a sequence number exists in multicast data. Therefore, there is the possibility that, although necessary data frames are received successfully in order and the data can be delivered to the upper layer, the apparatus of the transmission destination may wait for re-sending of a beacon signal considered as being undelivered.

Further, a beacon frame is not re-sent. Therefore, conventionally the apparatus of the transmission destination cannot deliver the data to the upper layer if, after a predetermined timer is activated, the timer does not indicate timeout through a reception waiting process.

Further, also where a plurality of multicast communications exist, conventionally since a same sequence number space is utilized, when data for individual multicast communications are transmitted in a mixed manner, sequence numbers become intermittent. In this case, if the apparatus of the transmission destination cannot receive data frames of multicast communications that need not be received by the own apparatus, then it sometimes makes a wrong decision that undelivered data destined for the own apparatus exists. Further, there is the possibility that the apparatus of the transmission destination may keep on waiting data re-sent by a block ACK frame in which sequence numbers whose data are received are described in a bitmap.

In this manner, although all multicast data to be received have become available, sequence numbers sometimes become intermittent due to multicast data destined for a different apparatus or to failure in reception or the like of a management frame. In this case, the apparatus of the transmission destination cannot pass the reception multicast data at an appropriate timing to the application of the upper layer. Therefore, there is the possibility that this may become a significant obstacle when real time (real time) image transmission for which a design for minimization of a transmission delay is demanded is carried out.

Therefore, in the embodiment of the present technology, a wireless communication method can be implemented by which an apparatus of the transmission source adds and transmits map information regarding sequence numbers to and together with a block ACK request such that an apparatus of the transmission destination reconstructs them.

In particular, the apparatus of the transmission source adds and transmits map information for specifying sequence numbers of data to be passed to an application of an upper layer to and together with a block ACK request frame. It is to be noted that the data to be passed to the application of the upper layer is, for example, data for multicast communication, a data frame mixed with a management frame, or a data part including parity information.

Further, the apparatus of the transmission destination can grasp presence of data whose re-sending is not required from among undelivered data on the basis of map information of the block ACK request frame. Further, the apparatus of the transmission destination can specify data of a sequence to be passed to the application of the upper layer and pass the data. Consequently, data frames collected by the apparatus of the transmission destination can be conveyed immediately to the upper layer.

In other words, when the apparatus of the transmission source performs reception confirmation of transmission data through a block ACK request, it transmits a block ACK request including map information of sequence numbers of data whose reception confirmation is to be performed thereby to notify of sequence numbers of data whose reception confirmation is unnecessary.

Further, by receiving a block ACK request including map information of sequence numbers of data whose reception confirmation is to be confirmed, the apparatus of the transmission destination can grasp presence of data that are not transmitted again among undelivered data. Then, at a stage at which data to be passed to the upper layer are collected successfully, the apparatus of the transmission destination can pass the data to the upper layer.

In this manner, in the embodiment of the present technology, map information of sequences of multicast communication data to be collected by the own apparatus is described into a block ACK request frame. Consequently, the sequences can be distinguished from sequence numbers utilized by other communications. Further, the data of multicast communication collected by the own apparatus can be passed without delay to an application of an upper layer.

Also where a plurality of multicast communications exist in a mixed manner, the sequence numbers of data to be received by the own apparatus can be specified. Further, also where management frames and data frames are transmitted in a mixed manner, only the data frames can be separated and collected. Further, also where data whose ACK is not required and data whose ACK is required are transmitted in a mixed manner, data whose notification is required as ACK can be specified in advance.

Further, by adding request map information to a block ACK request frame, even when a data frame fails to be received, a sequence number that requires returning of ACK can be specified. Consequently, a sequence of data to be passed to the application of the upper layer can be specified definitely and the data can be delivered without delay.

Further, when data frames and frames including parity information are transmitted individually, the original data part can be specified. Further, the apparatus of the transmission destination can extract the parity information part. Then, when the apparatus of the transmission destination successfully repairs the data on the basis of the parity information, it can handle the repaired data as received data.

Further, the information processing apparatuses 100 to 103 in the embodiment of the present technology can be applied to apparatuses that are used in various fields. For example, they can be applied to a wireless apparatus used in an automobile (for example, a car navigation system or a smartphone). Further, they can be applied, for example, to learning apparatuses used in the education field (for example, a tablet terminal). Further, they can be applied, for example, to wireless apparatuses used in the agriculture field (for example, a terminal of a cattle management system). Similarly, they can be applied to various wireless apparatuses used, for example, in the sports field, medical field and so forth.

2. APPLICATION EXAMPLE

The technology according to the present disclosure can be applied to various products. For example, each of the information processing apparatuses 100 to 103 may be implemented as a mobile terminal such as a smartphone, a tablet PC (Personal Computer), a notebook PC, a portable game terminal or a digital camera, a fixed terminal such as a television receiver, a printer, a digital scanner or a network storage, or a vehicular terminal such as a car navigation system. Further, each of the information processing apparatuses 100 to 103 may be implemented as a terminal (also called MTC (Machine Type Communication) terminal) that performs M2M (Machine To Machine) communication such as a smart meter, a vending machine, a remote monitoring apparatus or a POS (Point Of Sale) terminal. Furthermore, each of the information processing apparatuses 100 to 103 may be a wireless communication module incorporated in such terminals as described above (for example, an integrated circuit module conformed by one die).

On the other hand, for example, the information processing apparatus 100 may be implemented as a wireless LAN access point (also called wireless base station) that has a router function or does not have a router function. Alternatively, the information processing apparatus 100 may be implemented as a mobile wireless LAN router. Furthermore, the information processing apparatus 100 may be a wireless communication module incorporated in such apparatuses as described above (for example, an integrated circuit module configured by one die).

2-1. First Application Example

Figure 15:
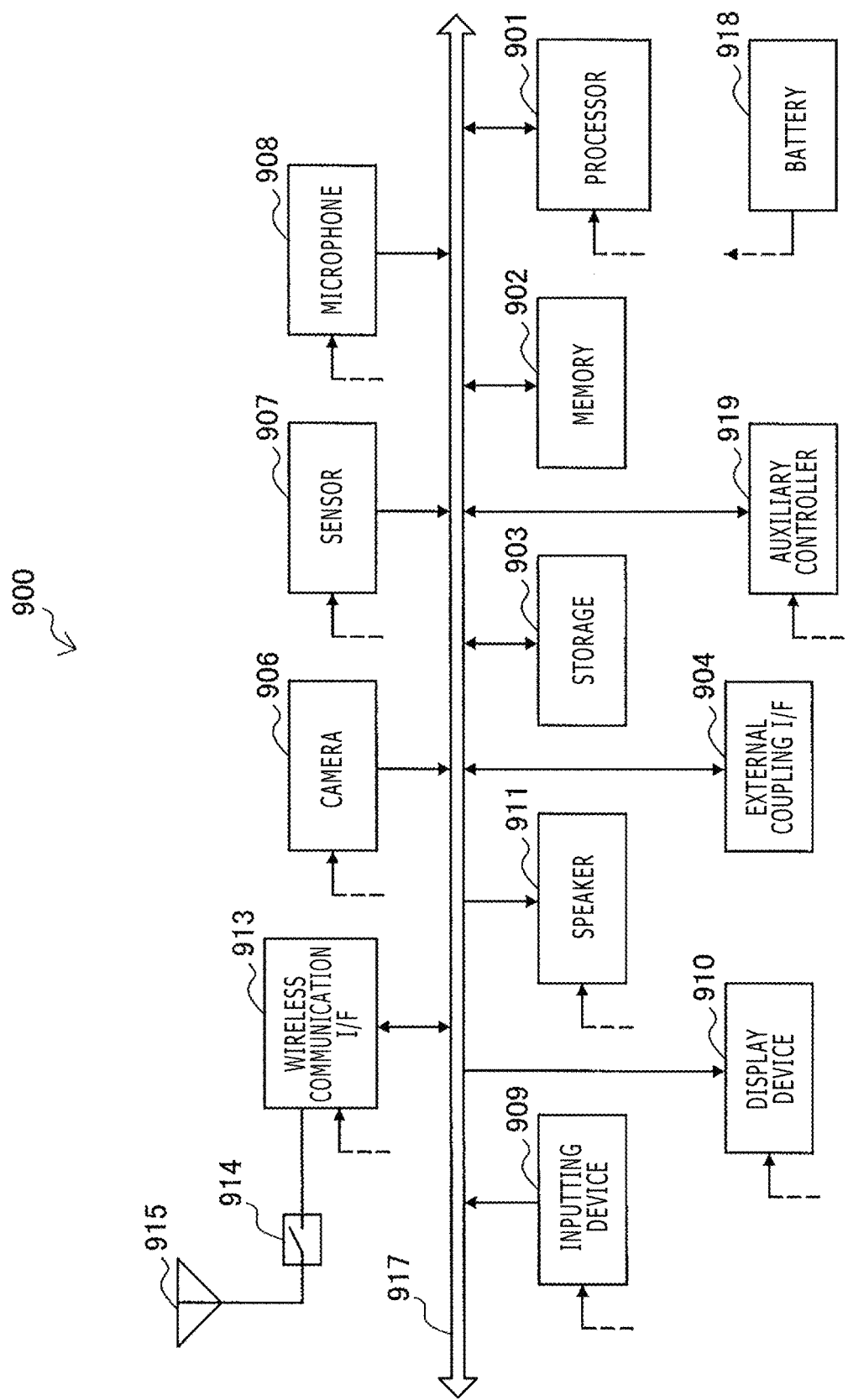
FIG. 15 is a block diagram depicting an example of a general configuration of a smartphone.

FIG. 15 is a block diagram depicting an example of a general configuration of a smartphone 900 to which the technology according to the present disclosure can be applied. The smartphone 900 includes a processor 901, a memory 902, a storage 903, an external coupling interface 904, a camera 906, a sensor 907, a microphone 908, an inputting device 909, a display device 910, a speaker 911, a wireless communication interface 913, an antenna switch 914, an antenna 915, a bus 917, a battery 918 and an auxiliary controller 919.

The processor 901 may be, for example, a CPU (Central Processing Unit) or an SoC (System on Chip), and controls the functions of the application layer and other layers of the smartphone 900. The memory 902 includes a RAM (Random Access Memory) and a ROM (Read Only Memory) and stores a program to be executed by the processor 901 and data. The storage 903 may include a storage medium such as a semiconductor memory or a hard disk. The external coupling interface 904 is an interface for coupling an external device such as a memory card or a USB (Universal Serial Bus) device to the smartphone 900.

The camera 906 has an image pickup element such as a CCD (Charge Coupled Device) element or a CMOS (Complementary Metal Oxide Semiconductor) element and generates a picked up image. The sensor 907 may include a sensor group such as, for example, a position sensor, a gyro sensor, a geomagnetism sensor and an acceleration sensor. The microphone 908 converts sound inputted to the smartphone 900 into an audio signal. The inputting device 909 includes, for example, a touch sensor for detecting a touch with the screen of the display device 910, a keypad, a keyboard, a button, a switch or the like and accepts an operation or an information input from a user. The display device 910 has a screen of an LCD (Liquid Crystal Display), an OLED (Organic Light Emitting Diode) display or the like and displays an output image of the smartphone 900. The speaker 911 converts an audio signal outputted from the smartphone 900 into sound.

The wireless communication interface 913 supports one or more of wireless LAN standards such as IEEE802.11a, 11b, 11g, 11n, 11ac and 11ad and executes wireless communication. The wireless communication interface 913 can communicate, in an infrastructure mode thereof, with a different apparatus through a wireless LAN access point. Further, the wireless communication interface 913 can communicate, in a direct communication mode such as an ad hoc mode or Wi-Fi Direct, directly with a different apparatus. It is to be noted that, while, in Wi-Fi Direct, different from the ad hoc mode, one of two terminals operates as an access point, communication is performed directly between the terminals. The wireless communication interface 913 typically may include a baseband processor, a RF (Radio Frequency) circuit, a power amplifier and so forth. The wireless communication interface 913 may be a one-chip module in which a memory for storing a communication control program, a processor for executing the program and related circuits are integrated. The wireless communication interface 913 may support, in addition to the wireless LAN method, a wireless communication method or methods different in type such as a short-range wireless communication method, a proximity wireless communication method or a cellular communication method. The antenna switch 914 switches the coupling destination of the antenna 915 between or among a plurality of circuits included in the wireless communication interface 913 (for example, circuits for different wireless communication methods). The antenna 915 has a single or a plurality of antenna elements (for example, a plurality of antenna elements that configure a MIMO (Multi-Input Multi-Output) antenna) and is used for transmission and reception of a wireless signal by the wireless communication interface 913.

It is to be noted that the smartphone 900 is not limited to the example of FIG. 15 and may include a plurality of antennae (for example, an antenna for a wireless LAN, an antenna for a proximity wireless communication method and so forth). In this case, the antenna switch 914 may be omitted from the configuration of the smartphone 900.

The bus 917 couples the processor 901, the memory 902, the storage 903, the external coupling interface 904, the camera 906, the sensor 907, the microphone 908, the inputting device 909, the display device 910, the speaker 911, the wireless communication interface 913 and the auxiliary controller 919 to each other. The battery 918 supplies power to the blocks of the smartphone 900 depicted in FIG. 15 through a feed line partially indicated by broken lines in the figure. The auxiliary controller 919 allows minimum necessary functions of the smartphone 900 to operate, for example, in a sleep mode.

In the smartphone 900 depicted in FIG. 15, the communication controlling unit 150 described hereinabove with reference to FIG. 2 may be incorporated in the wireless communication interface 913. Further, at least part of the functions described above may be incorporated in the processor 901 or the auxiliary controller 919.

It is to be noted that the smartphone 900 may operate as a wireless access point (software AP) by causing the processor 901 to execute an access point function on the application level. Further, the wireless communication interface 913 may have a wireless access point function.

2-2. Second Application Example

Figure 16:
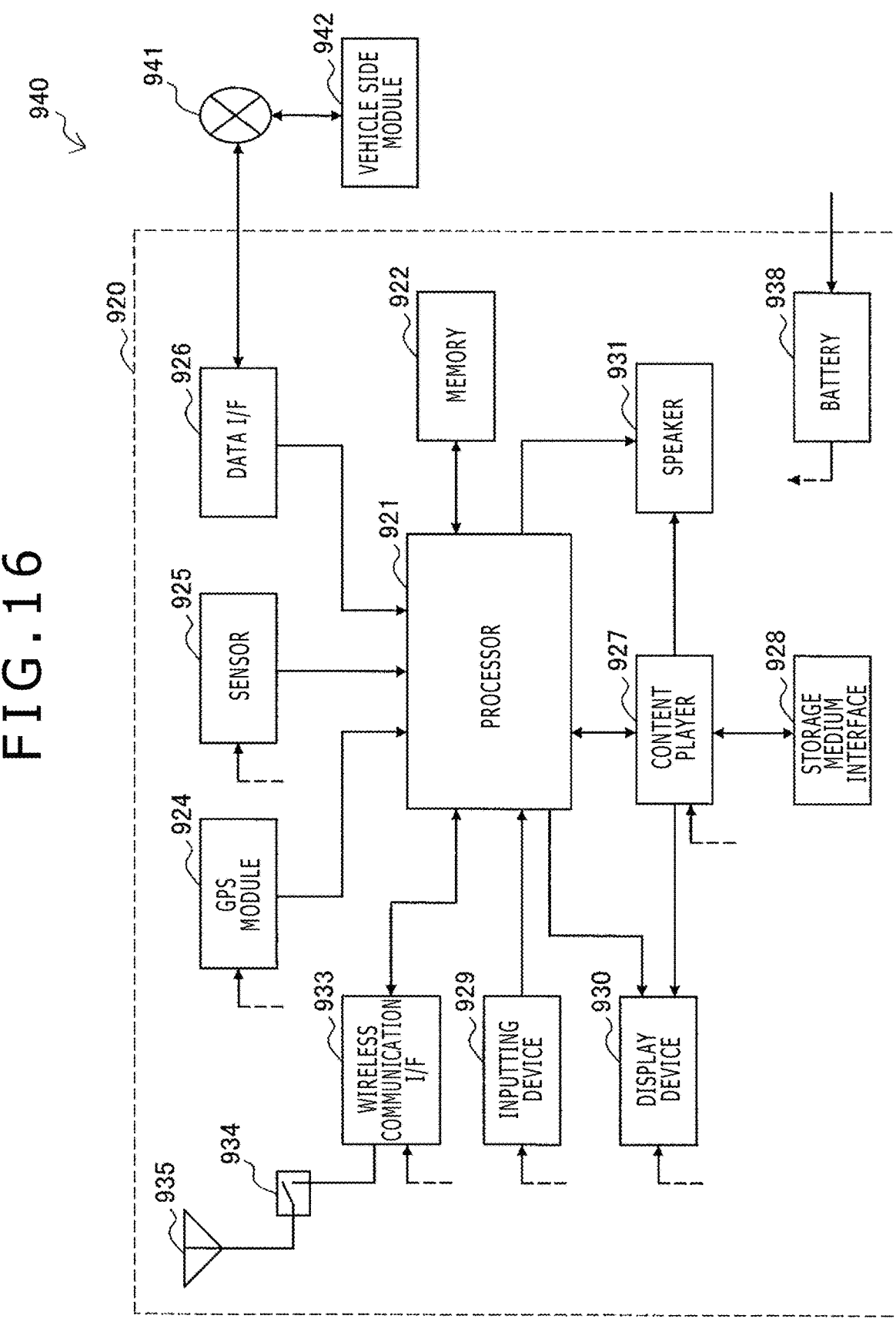
FIG. 16 is a block diagram depicting an example of a general configuration of a car navigation system.

FIG. 16 is a block diagram depicting an example of a general configuration of a car navigation apparatus 920 to which the technology of the present disclosure can be applied. The car navigation apparatus 920 includes a processor 921, a memory 922, a GPS (Global Positioning System) module 924, a sensor 925, a data interface 926, a content player 927, a storage medium interface 928, an inputting device 929, a display device 930, a speaker 931, a wireless communication interface 933, an antenna switch 934, an antenna 935 and a battery 938.

The processor 921 may be, for example, a CPU or a SoC and controls a navigation function and other functions of the car navigation apparatus 920. The memory 922 includes a RAM and a ROM and stores a program to be executed by the processor 921 and data.

The GPS module 924 measures the position of the car navigation apparatus 920 (for example, a latitude, a longitude and a height) using GPS signals received from GPS satellites. The sensor 925 may include a sensor group, for example, of a gyro sensor, a geomagnetism sensor and an atmospheric pressure sensor. The data interface 926 is coupled, for example, to an automotive network 941 through a terminal not depicted and acquires data generated by the vehicle side such as vehicle speed data.

The content player 927 reproduces a content stored in a storage medium (for example, a CD (Compact Disc) or a DVD (Digital Versatile Disc)) inserted in the storage medium interface 928. The inputting device 929 includes, for example, a touch sensor for detecting a touch with the screen of the display device 930, a button, a switch or the like and accepts an operation or an information input from the user. The display device 930 has a screen of an LCD or OLED display or the like and displays an image of a navigation function or a reproduced content. The speaker 931 outputs sound of the navigation function or of a reproduced content.

The wireless communication interface 933 supports one or more of wireless LAN standards such as IEEE802.11a, 11b, 11g, 11n, 11ac and 11ad and executes wireless communication. The wireless communication interface 933 can communicate, in an infrastructure mode thereof, with a different apparatus through a wireless LAN access point. Further, the wireless communication interface 933 can communicate, in a direct communication mode such as an ad hoc mode or Wi-Fi Direct, directly with a different apparatus. The wireless communication interface 933 typically may include a baseband processor, a RF circuit, a power amplifier and so forth. The wireless communication interface 933 may be a one-chip module in which a memory for storing a communication control program, a processor for executing the program and related circuits are integrated. The wireless communication interface 933 may support, in addition to the wireless LAN method, a wireless communication method or methods different in type such as a short-range wireless communication method, a proximity wireless communication method or a cellular communication method. The antenna switch 934 switches the coupling destination of the antenna 935 between or among a plurality of circuits included in the wireless communication interface 933. The antenna 935 has a single or a plurality of antenna elements and is used for transmission and reception of a wireless signal by the wireless communication interface 933.

It is to be noted that the car navigation apparatus 920 is not limited to the example of FIG. 16 and may include a plurality of antennae. In this case, the antenna switch 934 may be omitted from the configuration of the car navigation apparatus 920.

The battery 938 supplies power to the blocks of the car navigation apparatus 920 depicted in FIG. 16 through a feed line partially indicated by broken lines in the figure. Further, the battery 938 stores power fed from the vehicle side.

In the car navigation apparatus 920 depicted in FIG. 16, the communication controlling unit 150 described hereinabove with reference to FIG. 2 may be incorporated in the wireless communication interface 933. Further, at least part of the functions described above may be incorporated in the processor 921.

Further, the wireless communication interface 933 operates as the information processing apparatus 100 described hereinabove and may provide wireless coupling to a terminal owned by a user who is on the vehicle.

Further, the technology according to the present disclosure may be implemented as an automotive system (or vehicle) 940 including one or more of the blocks of the car navigation apparatus 920 described hereinabove, the automotive network 941, and a vehicle side module 942. The vehicle side module 942 generates vehicle side data such as a vehicle speed, an engine speed or failure information and outputs the generated data to the automotive network 941.

2-3. Third Application Example

Figure 17:
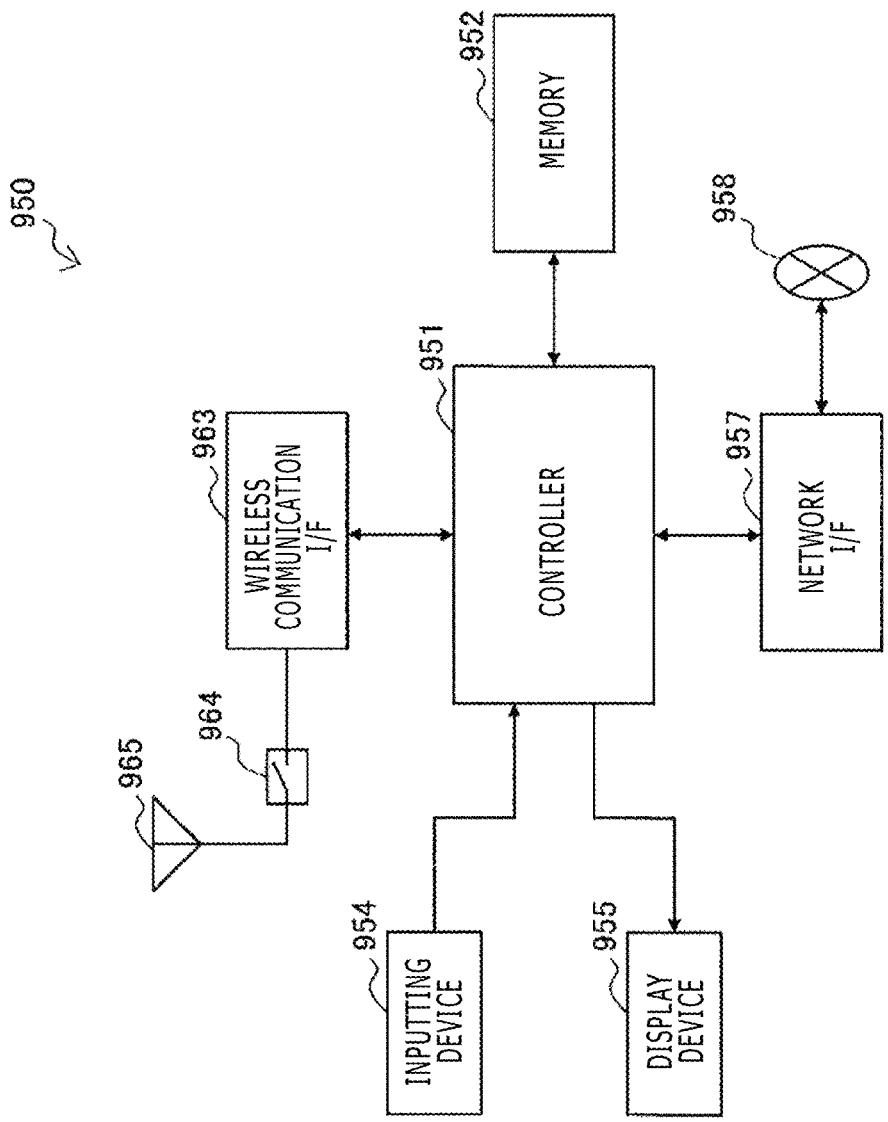
FIG. 17 is a block diagram depicting an example of a general configuration of a wireless access point.

FIG. 17 is a block diagram depicting an example of a general configuration of a wireless access point 950 to which the technology according to the present disclosure can be applied. The wireless access point 950 includes a controller 951, a memory 952, an inputting device 954, a display device 955, a network interface 957, a wireless communication interface 963, an antenna switch 964 and an antenna 965.

The controller 951 may be, for example, a CPU or a DSP (Digital Signal Processor) and controls various functions of the IP (Internet Protocol) layer and other upper layers of the wireless access point 950 (for example, access restriction, routing, encryption, firewall, log management and so forth) to operate. The memory 952 includes a RAM and a ROM and stores a program to be executed by the controller 951 and various control data (for example, a terminal list, a routing table, an encryption key, security setting, a log and so forth).

The inputting device 954 includes, for example, a button, a switch or the like and accepts an operation from a user. The display device 955 includes an LED lamp or the like and displays an operation status of the wireless access point 950.

The network interface 957 is a wired communication interface for coupling the wireless access point 950 to a wired communication network 958. The network interface 957 may have a plurality of coupling terminals. The wired communication network 958 may be a LAN such as the Ethernet (registered trademark) or may be a WAN (Wide Area Network).

The wireless communication interface 963 supports one or more of wireless LAN standards such as IEEE802.11a, 11b, 11g, 11n, 11ac and 11ad and provides wireless coupling as an access point to terminals in the vicinity. The wireless communication interface 963 typically may include a baseband processor, a RF circuit, a power amplifier and so forth. The wireless communication interface 963 may be a one-chip module in which a memory for storing a communication control program, a processor for executing the program and related circuits are integrated. The antenna switch 964 switches the coupling destination of the antenna 965 between or among a plurality of circuits included in the wireless communication interface 963. The antenna 965 has a single or a plurality of antenna elements and is used for transmission and reception of a wireless signal by the wireless communication interface 963.

In the wireless access point 950 depicted in FIG. 17, the communication controlling unit 150 described hereinabove with reference to FIG. 2 may be incorporated in the wireless communication interface 963. Further, at least part of the functions described above may be incorporated in the processor 951.

It is to be noted that the embodiment described above indicates an example for embodying the present technology, and matters in the embodiment and matters to define the invention in the claims individually have a corresponding relationship. Similarly, matters to define the invention in the claims and matters in the embodiment of the present technology having same designations applied thereto individually have a corresponding relationship. However, the present technology is not limited to the embodiment and can be embodied by modifying the embodiment in various manners without departing from the subject matter of the present technology.

Further, any of the processing procedures described hereinabove in connection with the above-described embodiment may be grasped as a method having the series of procedures and may be grasped as a program for causing a computer to execute the series of procedures or as a recording medium in which the program is stored. As the recording medium, for example, a CD, an MD (Mini Disc), a DVD, a memory card, a blue ray disc (Blu-ray (registered trademark) Disc) and so forth can be used.

It is to be noted that the advantageous effects described herein are illustrative to the last and are not restrictive, and other advantages may be available.

It is to be noted that the present technology can take the following configurations.

(1)

An information processing apparatus, including:

a control unit configured to perform control for adding, to request information for requesting a different apparatus for a confirmation response to a plurality of data transmitted to the different apparatus, notification information regarding at least sequence numbers other than a start sequence number from among sequence numbers corresponding to the plurality of data and transmitting the request information, to which the notification information is added, to the different apparatus.

(2)

The information processing apparatus according to (1) above, wherein the control unit adds and transmits the notification information regarding a sequence number corresponding to specific data from among the plurality of data to and together with the request information to the different apparatus.

(3)

The information processing apparatus according to (2) above, wherein the specific data is data destined for the information processing apparatus.

(4)

The information processing apparatus according to (2) or (3) above, wherein the specific data is data to be passed to an upper layer.

(5)

The information processing apparatus according to any one of (2) to (4) above, wherein the specific data is data of multicast communication to be received.

(6)

The information processing apparatus according to any one of (2) to (5) above, wherein the specific data is data from which parity information is removed.

(7)

The information processing apparatus according to any one of (1) to (6) above, wherein the request information is a block acknowledgement request frame.

(8)

The information processing apparatus according to any one of (1) to (7) above, wherein the control unit adds and transmits the notification information regarding successive sequence numbers or intermittent sequence numbers from among the sequence numbers corresponding to the plurality of data to and together with the request information to the different apparatus.

(9)

An information processing apparatus, including:

a control unit configured to decide, when request information that requests a confirmation response to a plurality of data transmitted from a different apparatus and to which notification information regarding at least sequence numbers other than a start sequence number from among sequence numbers corresponding to the plurality of data is added is received from the different apparatus, based on the notification information whether or not undelivered data exists from among data to be received by the own apparatus from among the plurality of data and perform, when the undelivered data does not exist, control for passing the plurality of data to an upper layer.

(10)

The information processing apparatus according to (9) above, wherein the control unit transmits, when the undelivered data exists, the confirmation response to which information regarding a sequence number for specifying the undelivered data is added to the different apparatus and performs, when the undelivered data no more exists as a result of re-sending of the undelivered data from the different apparatus, control for passing the plurality of data to the upper layer.

(11)

The information processing apparatus according to (9) above, wherein the control unit passes, when the plurality of data that have successive sequence numbers are received without an error, the plurality of data to the upper layer without receiving the request information.

(12)

The information processing apparatus according to (9) above, wherein the control unit considers, when the plurality of data include data of parity information, the undelivered data that is repaired based on the parity information as data received already.

(13)

A communication system, comprising:

a first information processing apparatus configured to add, to request information for requesting a second information processing apparatus for a confirmation response to a plurality of data transmitted to the second information processing apparatus, notification information regarding at least sequence numbers other than a start sequence number from among sequence numbers corresponding to the plurality of data and transmit the request information, to which the notification information is added, to the second information processing apparatus; and the second information processing apparatus configured to decide, when the request information is received from the first information processing apparatus, based on the notification information included in the request information whether or not undelivered data exists from among data to be received by the own apparatus from among the plurality of data and pass, when the undelivered data does not exist, the plurality of data to an upper layer.

(14)

An information processing method, including:

a control procedures for adding, to request information for requesting a different apparatus for a confirmation response to a plurality of data transmitted to the different apparatus, notification information regarding at least sequence numbers other than a start sequence number from among sequence numbers corresponding to the plurality of data and transmitting the request information, to which the notification information is added, to the different apparatus.

(15)

An information processing apparatus, comprising:

a decision procedure of deciding, when request information that requests a confirmation response to a plurality of data transmitted from a different apparatus and to which notification information regarding at least sequence numbers other than a start sequence number from among sequence numbers corresponding to the plurality of data is added is received from the different apparatus, based on the notification information whether or not undelivered data exists from among data to be received by the own apparatus from among the plurality of data; and a control procedure of passing, when the undelivered data does not exist, the plurality of data to an upper layer.

(16)

A program for causing a computer to execute:

a control procedure for adding, to request information for requesting a different apparatus for a confirmation response to a plurality of data transmitted to the different apparatus, notification information regarding at least sequence numbers other than a start sequence number from among sequence numbers corresponding to the plurality of data and transmitting the request information, to which the notification information is added, to the different apparatus.

(17)

A program for causing a computer to execute:

a decision procedure for deciding, when request information that requests a confirmation response to a plurality of data transmitted from a different apparatus and to which notification information regarding at least sequence numbers other than a start sequence number from among sequence numbers corresponding to the plurality of data is added is received from the different apparatus, based on the notification information whether or not undelivered data exists from among data to be received by the own apparatus from among the plurality of data; and a controlling procedure for passing, when the undelivered data does not exist, the plurality of data to an upper layer.

REFERENCE SIGNS LIST

10 Communication system
100 to 103 Information processing apparatus
110 Interface unit
111 Inputting unit
112 Outputting unit
120 Buffer management unit
130 Transmission buffer unit
140 Reception buffer unit
150 Communication controlling unit
151 Transmission data frame construction unit
152 Multicast transmission sequence management unit
153 Block ACK request construction unit
154 Reception data frame extraction unit
155 Block ACK request extraction unit
156 Multicast reception sequence management unit
157 Block ACK construction unit
158 Block ACK extraction unit
160 Wireless signal transmission processing unit
170 Access controlling unit
180 Wireless signal reception processing unit
190 Antenna controlling unit
191, 192 Antenna element 900 Smartphone
901 Processor
902 Memory
903 Storage
904 External coupling interface
906 Camera
907 Sensor
908 Microphone
909 Inputting device
910 Display device
911 Speaker
913 Wireless communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Content player
928 Storage medium interface
929 Inputting device
930 Display device
931 Speaker
933 Wireless communication interface
934 Antenna switch
935 Antenna
938 Battery
941 Automotive network
942 Vehicle side module
950 Wireless access point
951 Controller
952 Memory
954 Inputting device
955 Display device
957 Network interface
958 Wired communication network
963 Wireless communication interface
964 Antenna switch
965 Antenna

The invention claimed is:

1. An information processing apparatus, comprising:
circuitry configured to perform control for
adding a notification information field to a request information field for requesting each of a plurality of different apparatuses for a confirmation response to specific data from among a plurality of data transmitted to the plurality of different apparatuses, the request information field regarding a start sequence number for the confirmation response, the notification information field regarding sequence numbers described in a bitmap of a variable length corresponding to the specific data from among the plurality of data for the confirmation response, and
transmitting the notification information field together with the request information field, to which the notification information field is added, and an indication that the notification information is added, to each of the plurality of different apparatuses.

2. The information processing apparatus according to claim 1, wherein the specific data is data destined for the information processing apparatus.

3. The information processing apparatus according to claim 1, wherein the specific data is data to be passed to an upper layer.

4. The information processing apparatus according to claim 1, wherein the specific data is data of multicast communication to be received.

5. The information processing apparatus according to claim 1, wherein the specific data is data from which parity information is removed.

6. The information processing apparatus according to claim 1, wherein the circuitry is configured to add and transmit the notification information field regarding successive sequence numbers or intermittent sequence numbers from among the sequence numbers corresponding to the specific data from among the plurality of data to and together with the request information field to each of the plurality of different apparatuses.

7. The information processing apparatus according to claim 1, wherein the sequence numbers described in the bitmap include at least sequence numbers other than the start sequence number.

8. An information processing apparatus, comprising:
circuitry configured to:
receive specific data from among a plurality of data transmitted from a different apparatus to a plurality of information processing apparatuses including the information processing apparatus;
receive a request information field, a notification information field, and an indication that the notification information is added from the different apparatus,
the request information field regarding a start sequence number for a confirmation response to the specific data from among the plurality of data, the notification information field regarding sequence numbers described in a bitmap of a variable length corresponding to the specific data from among the plurality of data; and
decide, based on the notification information field, whether or not undelivered data exists from among the specific data from among the plurality of data.

9. The information processing apparatus according to claim 8, wherein the circuitry is configured to transmit, when the undelivered data exists, a confirmation response to which information regarding a sequence number for specifying the undelivered data is added to the different apparatus and perform, when the undelivered data no longer exists as a result of re-sending of the undelivered data from the different apparatus, control for passing the specific data from among the plurality of data to the upper layer.

10. The information processing apparatus according to claim 8, wherein the circuitry is configured to pass, when the plurality of data that have successive sequence numbers are received without an error, the plurality of data to the upper layer without receiving the request information field.

11. The information processing apparatus according to claim 8, wherein the circuitry is configured to consider, when the specific data from among the plurality of data include data of parity information, the undelivered data that is repaired based on the parity information as data received already.

12. The information processing apparatus according to claim 8, wherein the sequence numbers described in the bitmap include at least sequence numbers other than the start sequence number.

13. The information processing apparatus according to claim 1, wherein the circuitry is configured to transmit an indication that the notification information field is added to each of the plurality of different apparatuses.

14. The information processing apparatus according to claim 13, wherein the circuitry is configured to transmit a block acknowledgement request frame including the notification information field together with the request information field, to which the notification information field is added, and the indication that the notification information field is added, to each of the plurality of different apparatuses.

15. The information processing apparatus according to claim 8, wherein the circuitry is configured to perform, when the undelivered data does not exist, control for passing the specific data from among the plurality of data to an upper layer.

16. The information processing apparatus according to claim 8, wherein the circuitry is configured to receive an indication that the notification information field is added from the different apparatus.

17. The information processing apparatus according to claim 8, wherein the specific data is data destined for the information processing apparatus.

18. The information processing apparatus according to claim 8, wherein the specific data is data to be passed to an upper layer.

19. The information processing apparatus according to claim 8, wherein the specific data is data of multicast communication to be received.

20. The information processing apparatus according to claim 8, wherein the specific data is data from which parity information is removed.

* * * * *